US011955764B2

(12) United States Patent
Xu et al.

(10) Patent No.: US 11,955,764 B2
(45) Date of Patent: Apr. 9, 2024

(54) SUBMARINE NETWORK DEVICE

(71) Applicant: HUAWEI MARINE NETWORKS CO., LTD., Tianjin (CN)

(72) Inventors: Changwu Xu, Tianjin (CN); Yuhe Li, Tianjin (CN); Ge Jin, Tianjin (CN); Yan Wang, Tianjin (CN); Liping Ma, Tianjin (CN)

(73) Assignee: HMN Technologies Co., Limited, Tianjin (CN)

( * ) Notice: Subject to any disclaimer, the term of this patent is extended or adjusted under 35 U.S.C. 154(b) by 835 days.

(21) Appl. No.: 16/980,478

(22) PCT Filed: Aug. 27, 2018

(86) PCT No.: PCT/CN2018/102511
§ 371 (c)(1),
(2) Date: Sep. 14, 2020

(87) PCT Pub. No.: WO2020/041931
PCT Pub. Date: Mar. 5, 2020

(65) Prior Publication Data
US 2021/0028591 A1 Jan. 28, 2021

(51) Int. Cl.
*H01S 3/30* (2006.01)
*H01S 3/067* (2006.01)
(Continued)

(52) U.S. Cl.
CPC ...... *H01S 3/06754* (2013.01); *H01S 3/06716* (2013.01); *H01S 3/06737* (2013.01);
(Continued)

(58) Field of Classification Search
CPC ............ H01S 3/06754; H01S 3/06716; H01S 3/06737; H01S 3/094053; H01S 3/094061;
(Continued)

(56) References Cited

U.S. PATENT DOCUMENTS 7,103,275 B2 9/2006 Fujiwara
9,876,574 B2 1/2018 Zhang
(Continued)

FOREIGN PATENT DOCUMENTS

CN 101997612 A 3/2011
EP 3136623 A1 3/2017
(Continued)

OTHER PUBLICATIONS

Supplementary European Search Report regarding EP 18931525.2, dated Jun. 7, 2021.
(Continued)

*Primary Examiner* — Kinam Park
(74) *Attorney, Agent, or Firm* — Harness, Dickey & Pierce, P.L.C.

(57) ABSTRACT

Disclosed is a submarine network device, comprising a fiber set, a pump laser set, an erbium doped fiber amplifier (EDFA) set, a primary fiber coupler (CPL) set and a secondary CPL set, wherein the primary CPL set comprises N primary CPLs, the secondary CPL set comprises N secondary CPLs, with N being an integer greater than or equal to 3. The fiber set is configured to connect the pump laser set, the primary CPL set, the secondary CPL set and the EDFA set. An input port of each primary CPL in the primary CPL set is at least connected with a pump laser. An output port of each secondary CPL in the secondary CPL set is at least connected with an EDFA. Output ports of each primary CPL in the primary CPL set are respectively connected with two different secondary CPLs that are spaced by a secondary CPL, and input ports of each secondary CPL in the secondary CPL set are respectively connected with two different primary CPLs that are spaced by a primary CPL.

22 Claims, 12 Drawing Sheets

(51) Int. Cl.
*H01S 3/094* (2006.01)
*H04B 10/291* (2013.01)
*H04B 10/293* (2013.01)

(52) U.S. Cl.
CPC .. *H01S 3/094053* (2013.01); *H01S 3/094061* (2013.01); *H01S 3/09408* (2013.01); *H04B 10/2912* (2013.01); *H04B 10/293* (2013.01)

(58) Field of Classification Search
CPC .. H01S 3/09408; H01S 3/1608; H01S 3/2383; H01S 3/094011
See application file for complete search history.

(56) References Cited

U.S. PATENT DOCUMENTS

| | | | | |
|---|---|---|---|---|
| 10,135,221 | B2* | 11/2018 | Sun | H01S 3/09408 |
| 2003/0072062 | A1* | 4/2003 | Pedersen | H04B 10/2916 |
| | | | | 398/97 |
| 2004/0042064 | A1 | 3/2004 | Shieh et al. | |
| 2004/0070819 | A1 | 4/2004 | Farley et al. | |
| 2004/0085624 | A1* | 5/2004 | Liu | H01S 3/06758 |
| | | | | 359/341.3 |
| 2004/0136056 | A1* | 7/2004 | Nagel | H04B 10/298 |
| | | | | 359/341.2 |
| 2004/0207912 | A1* | 10/2004 | Nagel | H01S 3/094003 |
| | | | | 359/341.3 |
| 2005/0226622 | A1* | 10/2005 | Trischitta | H04B 10/2916 |
| | | | | 398/92 |
| 2010/0209117 | A1* | 8/2010 | Chang | H04B 10/2935 |
| | | | | 398/178 |
| 2017/0063463 | A1* | 3/2017 | Zhang | H01S 3/06783 |
| 2019/0052390 | A1* | 2/2019 | Mikami | H04J 14/02 |

FOREIGN PATENT DOCUMENTS

| | | |
|---|---|---|
| WO | 03/030203 A1 | 4/2003 |
| WO | WO-2015172328 A1 | 11/2015 |
| WO | 2017056438 A1 | 4/2017 |
| WO | 2018047029 A1 | 3/2018 |
| WO | 2018097075 A1 | 5/2018 |
| WO | 2019176205 A1 | 9/2019 |

OTHER PUBLICATIONS

International Search Report (in English and Chinese) and Written Opinion of the International Searching Authority (in Chinese) issued in PCT/CN2018/102511; dated May 13, 2019; ISA/CN.

* cited by examiner

SUBMARINE NETWORK DEVICE

CROSS-REFERENCE TO RELATED APPLICATIONS

This application is a U.S. National Phase Application under 35 U.S.C. 371 of International Application No. PCT/CN2018/102511 filed on Aug. 27, 2018, the entire disclosure of the above application is incorporated herein by reference in its entirety.

FIELD OF THE INVENTION

The present invention relates to the field of submarine optical cable communications, and in particular, to a submarine network device.

BACKGROUND OF THE INVENTION

A long distance submarine fiber optical cable communication system (generally a link over 500 km) needs to be equipped with a submarine optical repeater so as to realize the amplification of the optical signal transmitted. The currently mature submarine optical repeaters are based on erbium doped fiber amplifier (EDFA) technology. The gain medium of EDFA is erbium-doped fiber, and during the normal working of an EDFA, a pump laser is required for providing excitation energy to the erbium doped fiber.

The pump laser belongs to active optical apparatus, and the failure rate thereof is high relative to other inactive optical apparatus. The failure of the pump laser will cause the optical repeater unable to work normally, and therefore a pump redundant design is often required to improve the overall reliability of the optical repeater. For example, in the single fiber pair 4×2 architecture (4 pump lasers×2 optical fibers) shown in FIG. 1, coupling and power redistribution are carried out via a fiber coupler (CPL) module on four lines of pumping laser output by four pump lasers, so that each pump laser respectively provides a half of the pumping energy to each of the two lines of erbium doped fiber. When a part of (at most three) the pump lasers fails, the rest pump lasers that work normally can still provide a part of the energy to the two lines of erbium doped fiber, so that the two lines of EDFA modules can still maintain a certain amplification function.

However, in such a pump redundant design solution, the number of the pump lasers is twice as many as the number of EDFA modules. Because each fiber pair corresponds to 2 EDFA modules, each time a fiber pair is added, the number of the pump lasers needs to be multiplied, which may cause a high cost, a high power consumption and a high heat consumption.

SUMMARY OF THE INVENTION

The embodiments of the present invention provide a submarine network device, which lowers the cost, the power consumption and the heat consumption of the submarine network device.

Therefore, in a first aspect of the embodiments of the invention, there provides a submarine network device, which includes a fiber set, a pump laser set, an EDFA set, a primary fiber coupler (CPL) set and a secondary CPL set, wherein, the primary CPL set includes N primary CPLs, the secondary CPL set includes N secondary CPLs, with N being an integer greater than or equal to 3, and the fiber set is configured to connect the pump laser set, the primary CPL set, the secondary CPL set and the EDFA set, an input port of each primary CPL in the primary CPL set is at least connected with a pump laser, an output port of each secondary CPL in the secondary CPL set is at least connected with an EDFA, each primary CPL in the primary CPL set is adjacent to the other two primary CPLs in the primary CPL set, and each secondary CPL in the secondary CPL set is adjacent to the other two secondary CPLs in the secondary CPL set, output ports of each primary CPL in the primary CPL set are respectively connected with two different secondary CPLs that are spaced by a secondary CPL, and input ports of each secondary CPL in the secondary CPL set are respectively connected with two different primary CPLs that are spaced by a primary CPL.

Each pump laser in the pump laser set is configured to emit pumping laser, and each primary CPL in the primary CPL set is configured for couple the received pumping laser and output two lines of primary pumping laser. The two lines of primary pumping laser are respectively output to two different secondary CPLs, and each secondary CPL in the secondary CPL set is configured to couple the received primary pumping laser and output at least one line of secondary pumping laser to at least one EDFA.

In an implementation of the invention, the pumping laser energy of each line of EDFA is jointly provided by at least two pump lasers. Even if a part of the pump laser corresponding to each line of EDFA fails to work, the EDFA module can still maintain a certain amplification function. On this basis, because the input port of each primary CPL is connected with at least one pump laser, the output port of each secondary CPL is connected with at least one EDFA, and the number of the pump lasers does not need to be maintained as twice of that of the EDFA module. Therefore, the cost, the power consumption and the heat consumption of the submarine network device may be lowered.

Optionally, in some possible implementations:

each EDFA in the EDFA set corresponds to one optical fiber, and the output port of each secondary CPL in the secondary CPL set is connected with two EDFAs.

Optionally, in some possible implementations:

the two optical fibers corresponding to the two EDFAs connected with the output port of each secondary CPL form a fiber pair.

Optionally, in some possible implementations:

one optical fiber corresponding to one of the EDFAs connected with the output port of each secondary CPL and one optical fiber corresponding to one of the EDFAs connected with the output port of one secondary CPL adjacent to each secondary CPL form a fiber pair.

It should be noted that, a fiber pair (FP) refers to two optical fibers connected with the receiving port and the sending port of a line transmission equipment (LTE). The two optical fibers form a communication link with one line for receiving and the other line for sending, and different fiber pairs are isolated from each other.

In an implementation of the invention, there provides two different connection modes between the submarine network device and the fiber pair, thereby improving the flexibility of the solution.

Optionally, in some possible implementations:

the input port of each primary CPL in the primary CPL set is connected with two pump lasers, each line of primary pumping laser output by each primary CPL includes 50% of the energy respectively emitted by the two pump lasers connected with the input port of each primary CPL, each line of secondary pumping laser output by each secondary CPL in the secondary CPL set includes 25% of the energy respectively emitted by the four pump lasers connected with the input ports of two primary CPLs, and each secondary CPL is connected with two primary CPLs.

In an implementation of the invention, the pumping laser energy of each line of EDFA is jointly provided by four pump lasers corresponding thereto, and each pump laser contributes 25% of the energy. In this solution, at most three pump lasers thereof are allowed to fail, and the EDFA module can still maintain a certain amplification function, thereby improving the system reliability. Moreover, the number of the pump lasers is the same as that of the EDFAs, thus the number of the pump lasers used is small, the cost is low, the overall power consumption is small, and the overall heat consumption is small.

Optionally, in some possible implementations:

the input port of each primary CPL in the primary CPL set is connected with one pump laser, each line of primary pumping laser output by each primary CPL includes 50% of the energy respectively emitted by one pump laser connected with the input port of each primary CPL, each line of secondary pumping laser output by each secondary CPL in the secondary CPL set includes 25% of the energy respectively emitted by two pump lasers connected with the input ports of two primary CPLs, and each secondary CPL is connected with two primary CPLs.

Optionally, in some possible implementations:

the input port of each primary CPL in the primary CPL set is connected with four pump lasers, each line of primary pumping laser output by each primary CPL includes 50% of the energy respectively emitted by four pump lasers connected with the input port of each primary CPL, each line of secondary pumping laser output by each secondary CPL in the secondary CPL set includes 25% of the energy respectively emitted by eight pump lasers connected with the input ports of two primary CPLs, and each secondary CPL is connected with two primary CPLs.

In the above possible implementations, there further provides an implementation in which the input port of each primary CPL is connected with one or four pump lasers, thereby improving the flexibility of the solution.

Optionally, in some possible implementations:

the pump laser set, the EDFA set, the primary CPL set and the secondary CPL set are separately disposed in different planes.

In an implementation of the invention, different types of components in the submarine network device are separately disposed on different planes, so that there is a larger space for wiring between different types of components.

Optionally, in some possible implementations:

each pump laser in the pump laser set, each EDFA in the EDFA set, each primary CPL in the primary CPL set and each secondary CPL in the secondary CPL set are arranged annually.

In an implementation of the invention, each component in the submarine network device is arranged annually, a complete closed loop may be formed, and it has a structural symmetry. Moreover, unlimited expansion is supported on this basis.

In a second aspect of the embodiments of the invention, there provides a submarine network device, which includes a fiber set, a pump laser set, an EDFA set, a primary fiber coupler (CPL) set, a secondary CPL set and a tertiary CPL set, wherein the primary CPL set includes N primary CPLs, the secondary CPL set includes N secondary CPLs, and the tertiary CPL set includes N tertiary CPLs, with N being an integer greater than or equal to 5, and the fiber set is configured to connect the pump laser set, the primary CPL set, the secondary CPL set, the tertiary CPL set and the EDFA set, an input port of each primary CPL in the primary CPL set is at least connected with a pump laser, an output port of each tertiary CPL in the tertiary CPL set is at least connected with an EDFA, each primary CPL in the primary CPL set is adjacent to the other two primary CPLs in the primary CPL set, each secondary CPL in the secondary CPL set is adjacent to the other two secondary CPLs in the secondary CPL set, and each tertiary CPL in the tertiary CPL set is adjacent to the other three tertiary CPLs in the tertiary CPL set, and output ports of each primary CPL in the primary CPL set are respectively connected with two different secondary CPLs, the two different secondary CPLs connected with the output port of each primary CPL are spaced by two secondary CPLs, and input ports of each secondary CPL in the secondary CPL set are respectively connected with two different primary CPLs that are spaced by two primary CPLs, output ports of each secondary CPL in the secondary CPL set are respectively connected with two different tertiary CPLs that are spaced by a tertiary CPLs, and input ports of each tertiary CPL in the tertiary CPL set are respectively connected with two different secondary CPLs, and the two different secondary CPLs connected with the input port of each tertiary CPL are spaced by a primary CPL.

Each pump laser in the pump laser set is configured to emit pumping laser, each primary CPL in the primary CPL set is configured for couple the received pumping laser and output two lines of primary pumping laser, and the two lines of primary pumping laser are respectively output to the two different secondary CPLs connected with the output port of each primary CPL, each secondary CPL in the secondary CPL set is configured to couple the received primary pumping laser and output two lines of secondary pumping laser to two different tertiary CPLs, and each tertiary CPL in the tertiary CPL set is configured to couple the received secondary pumping laser and output at least one line of tertiary pumping laser to at least one EDFA.

In an implementation of the invention, the pumping laser energy of each line of EDFA is jointly provided by at least four pump lasers corresponding thereto. Even if a part of the pump laser corresponding to each line of EDFA fails, the EDFA module can still maintain a certain amplification function. On this basis, because the input port of each primary CPL is connected with at least one pump laser and the output port of each tertiary CPL is connected with at least one EDFA, in the submarine network device of this solution, the number of the pump lasers is not always more than that of EDFA modules. Therefore, the number of the pump lasers used is small, and the cost, and the power consumption and the heat consumption of the submarine network device are lowered.

Optionally, in some possible implementations:

each EDFA in the EDFA set corresponds to one optical fiber, and output ports of each tertiary CPL in the tertiary CPL set are connected with two EDFAs.

Optionally, in some possible implementations:

the two optical fibers corresponding to the two EDFAs connected with the output port of each tertiary CPL form a fiber pair.

Optionally, in some possible implementations:

one optical fiber corresponding to one of the EDFAs connected with the output port of each tertiary CPL and one optical fiber corresponding to one of the EDFAs connected with the output port of a tertiary CPL adjacent to each tertiary CPL form a fiber pair.

In an implementation of the invention, there provides two different connection modes between the submarine network device and the fiber pair, thereby improving the flexibility of the solution.

Optionally, in some possible implementations:

the input port of each primary CPL in the primary CPL set is connected with two pump lasers, each line of primary pumping laser output by each primary CPL includes 50% of the energy respectively emitted by the two pump lasers connected with the input port of each primary CPL, each line of secondary pumping laser output by each secondary CPL in the secondary CPL set includes 25% of the energy respectively emitted by the four pump lasers connected with the input ports of two primary CPLs, and each secondary CPL is connected with two primary CPLs, each line of tertiary pumping laser output by each tertiary CPL in the tertiary CPL set includes 12.5% of the energy respectively emitted by eight pump lasers connected with the input ports of four primary CPLs, each tertiary CPL is connected with two secondary CPLs, and the two secondary CPLs are connected with four primary CPLs.

In an implementation of the invention, the pumping laser energy of each line of EDFA is jointly provided by eight pump lasers corresponding thereto, and each pump laser contributes 12.5% of the energy. In this solution, at most seven pump lasers thereof are allowed to fail, and the EDFA module can still maintain a certain amplification function, thereby improving the system reliability. Moreover, the number of the pump lasers is the same as that of the EDFAs, thus the number of the pump lasers used is small, the cost is low, the overall power consumption is small, and the overall heat consumption is small.

Optionally, in some possible implementations:

the input port of each primary CPL in the primary CPL set is connected with one pump laser, each line of primary pumping laser output by each primary CPL includes 50% of the energy respectively emitted by one pump laser connected with the input port of each primary CPL, each line of secondary pumping laser output by each secondary CPL in the secondary CPL set includes 25% of the energy respectively emitted by two pump lasers connected with the input ports of two primary CPLs, each secondary CPL is connected with two primary CPLs, and each line of tertiary pumping laser output by each tertiary CPL in the tertiary CPL set includes 12.5% of the energy respectively emitted by four pump lasers connected with the input ports of four primary CPLs, each tertiary CPL is connected with two secondary CPLs, and the two secondary CPLs are connected with four primary CPLs.

Optionally, in some possible implementations:

the input port of each primary CPL in the primary CPL set is connected with four pump lasers, each line of primary pumping laser output by each primary CPL includes 50% of the energy respectively emitted by four pump lasers connected with the input port of each primary CPL, each line of secondary pumping laser output by each secondary CPL in the secondary CPL set includes 25% of the energy respectively emitted by the eight pump lasers connected with the input ports of two primary CPLs, each secondary CPL is connected with two primary CPLs, and each line of tertiary pumping laser output by each tertiary CPL in the tertiary CPL set includes 12.5% of the energy respectively emitted by sixteen pump lasers connected with the input ports of four primary CPLs, each tertiary CPL is connected with two secondary CPLs, and the two secondary CPLs are connected with four primary CPLs.

In the above possible implementations, there further provides an implementation in which the input port of each primary CPL is connected with one or four pump lasers, thereby improving the flexibility of the solution.

Optionally, in some possible implementations:

the pump laser set, the EDFA set, the primary CPL set, the secondary CPL set and the tertiary CPL set are separately disposed in different planes.

In an implementation of the invention, different types of components in the submarine network device are separately disposed on different planes, so that there is a larger space for wiring between different types of components.

Optionally, in some possible implementations:

each pump laser in the pump laser set, each EDFA in the EDFA set, each primary CPL in the primary CPL set, each secondary CPL in the secondary CPL set and each tertiary CPL in the tertiary CPL set are arranged annually.

In an implementation of the invention, each component in the submarine network device is arranged annually, a complete closed loop may be formed, and it has a structural symmetry. Moreover, unlimited expansion is supported on this basis.

In a third aspect of the embodiments of the invention, there provides a submarine network device, which includes a pump laser set, an EDFA set, a primary fiber coupler (CPL) set and a secondary CPL set, wherein the primary CPL set at least includes three CPL primary CPLs, the secondary CPL set at least includes three secondary CPLs, and an input port of each primary CPL in the primary CPL set is at least connected with a pump laser, an output port of each secondary CPL in the secondary CPL set is connected with at least one EDFA in the EDFA set, output ports of at least one primary CPL in the primary CPL set are respectively connected with two different secondary CPLs that are spaced by a secondary CPL, and input ports of at least one secondary CPL in the secondary CPL set are respectively connected with two different primary CPLs that are spaced by a primary CPL.

Each pump laser in the pump laser set is configured to emit pumping laser, at least one primary CPL in the primary CPL set is configured to couple the received pumping laser and output two lines of primary pumping laser, the two lines of primary pumping laser being respectively output to the two different secondary CPLs, and at least one secondary CPL in the secondary CPL set is configured to couple the received primary pumping laser and output at least one line of secondary pumping laser to the at least one EDFA.

In an implementation of the invention, the pumping laser energy of each line of EDFA is jointly provided by at least two pump lasers. Even if a part of the pump laser corresponding to each line of EDFA fails, the EDFA module can still maintain a certain amplification function. On this basis, because the input port of each primary CPL is connected with at least one pump laser, the output port of each secondary CPL is connected with at least one EDFA, and the number of the pump lasers does not need to be maintained as twice of that of the EDFA module, thus the cost, the power consumption and the heat consumption of the submarine network device may be lowered.

Optionally, in some possible implementations:

each EDFA in the EDFA set corresponds to one optical fiber, and the output port of each secondary CPL in the secondary CPL set is connected with two EDFAs.

Optionally, in some possible implementations:

the two optical fibers corresponding to the two EDFAs connected with the output port of each secondary CPL form a fiber pair.

Optionally, in some possible implementations:

one optical fiber corresponding to one of the EDFAs connected with the output port of each secondary CPL and one optical fiber corresponding to one of the EDFAs connected with the output port of one secondary CPL adjacent to each secondary CPL form a fiber pair.

In an implementation of the invention, there provides two different connection modes between the submarine network device and the fiber pair, thereby improving the flexibility of the solution.

DETAILED DESCRIPTION OF THE EMBODIMENTS

Figure 1:
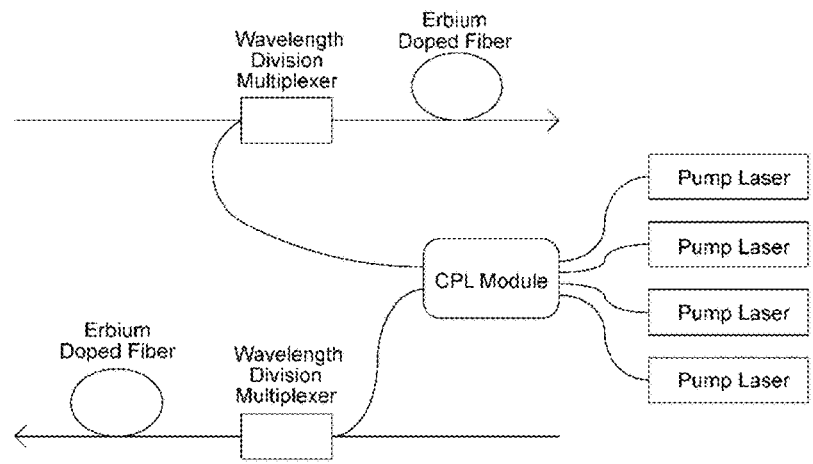
FIG. 1 is a schematic diagram showing a pump redundant solution of a single fiber pair 4×2 architecture in the prior art.

The embodiments of the invention provide a submarine network device, thereby lowering the cost, the power consumption and the heat consumption of the submarine network device.

Terms first, second, third, fourth and the like (if exist) in the specification of the invention and the claims and the above drawings are used for distinguishing between similar objects, rather than describing a specific order or sequence. It should be understood that data used in such a manner may be interchanged under appropriate circumstances so as to implement the embodiments described herein an order other than those shown or described here. Additionally, terms include and have and any variations thereof intend to cover nonexclusive include, for example, a process, a method, a system, a product or a device including a series of steps or units are not necessarily limited to those steps or units listed explicitly; instead, other steps or units that are not listed explicitly or intrinsic to the process, method, product or device may be included.

The invention may be applied to the field of submarine fiber optical cable communications. The submarine network device in the invention may specifically be a submarine optical repeater. A long distance submarine fiber optical cable communication system (generally a link over 500 km) needs to be equipped with a submarine optical repeater to realize the amplification of an optical signal transmitted. The submarine optical repeater needs to operate underwater for a long period of time, and it is required to guarantee a design lifetime of 25 years. Because a construction craft is required in the maintenance of an underwater device of the submarine cable system and underwater maintenance has the features of high difficulty, long cycle and high cost, etc., underwater optical repeater needs to have high reliability so as to lower the risk of failure and maintenance.

The submarine optical repeater in the invention is based on EDFA technology. The gain medium of EDFA is erbium-doped fiber. During the normal working of an EDFA, a pump laser is required to provide excitation energy to the erbium-doped fiber. The pumping laser emitted by the pump laser and a signal light are coupled into the same fiber and fed into an erbium-doped fiber via a wavelength division multiplexer. After the erbium-doped fiber absorbs the pumping laser, the erbium ions transit to an excited state, and when a photon of the optical signal passes by, stimulated radiation occurs, and a photon with a frequency, a direction and a polarization the same as the photon of the signal light is generated, thereby realizing signal light amplification.

The pump laser belongs to active optical apparatus, and the failure rate thereof is high relative to other inactive optical apparatus. The failure of the pump laser will cause the optical repeater unable to work normally, thus a pump redundant design is often required to improve the overall reliability of the optical repeater. In the industry, the existing pump redundant solution mainly includes a single fiber 2×1 architecture, a single fiber pair 2×2 architecture and a single fiber pair 4×2 architecture.

Figure 2:
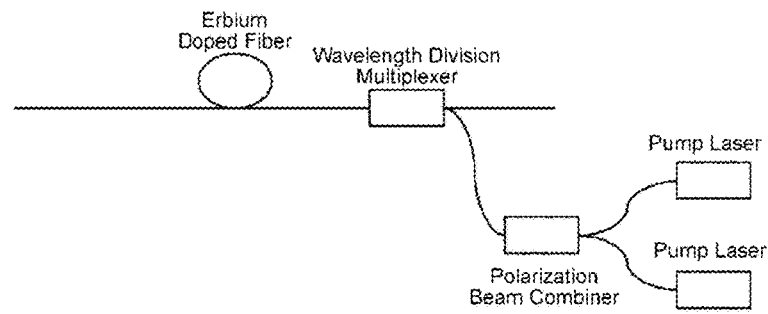
FIG. 2 is a schematic diagram showing a pump redundant solution of a single fiber 2×1 architecture in the prior art.

FIG. 2 shows the pump redundant design solution of single fiber 2×1 architecture (2 pump laser×1 optical fiber). After being coupled by a polarization beam combiner, the pumping laser output by the two pump lasers is input into the erbium-doped fiber on one optical fiber, that is, two pump lasers jointly support one line of EDFA module. When one pump laser fails, a half of the pump power can be input into the erbium-doped fiber, so that the EDFA module can still maintain a certain amplification function.

In this solution, the system reliability is low, when the two pump lasers supporting the same fiber fail at the same time, the EDFA module on the fiber will be unable to work, and thus system service interruption will be caused. Additionally, the number of the pump lasers is twice that of the EDFA modules, thus the cost is high, and the power consumption and the heat consumption are large.

Figure 3:
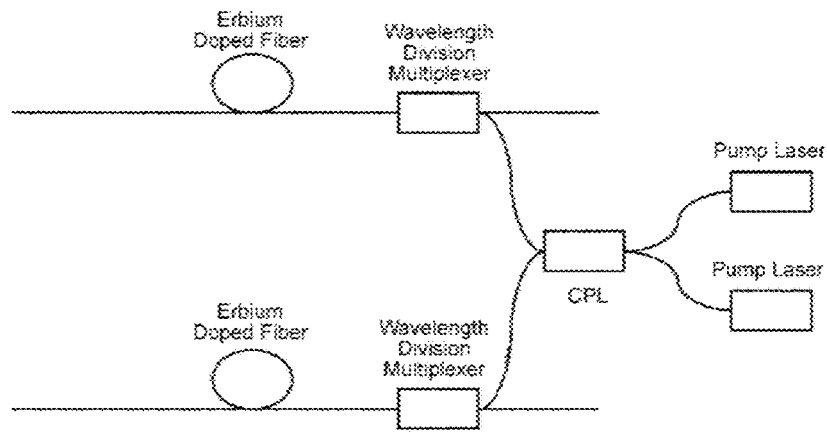
FIG. 3 is a schematic diagram showing a pump redundant solution of a single fiber pair 2×2 architecture in the prior art.

FIG. 3 shows a pump redundant design solution of a single fiber pair 2×2 architecture (2 pump lasers×2 optical fibers), wherein two pump lasers jointly support a pair (two lines) of EDFA modules. After the two lines of pumping laser output by the two pump lasers are coupled by the fiber coupler, the light power thereof is redistributed, so that each pump laser respectively provides a half of the pumping energy to each of the two lines of erbium-doped fiber. When one pump laser fails, the other pump laser can still provide energy to the two lines of erbium-doped fiber, so that the two lines of EDFA modules can still maintain a certain amplification function.

Figure 4:
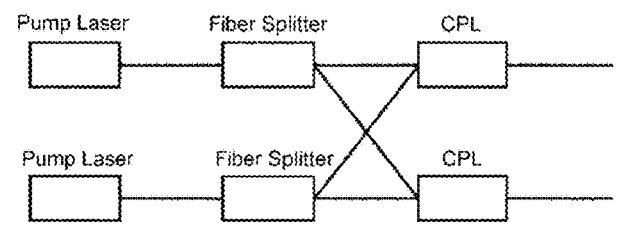
FIG. 4 is a schematic diagram showing a pump redundant solution of another single fiber pair 2×2 architecture in the prior art.

FIG. 4 shows another pump redundant design solution of single fiber pair 2×2 architecture (2 pump lasers×2 optical fibers), wherein the pumping laser output by each pump laser is split by a fiber splitter into two lines of sub-pumping laser. Then, the sub-pumping laser from one pump laser and the sub-pumping laser from the other pump laser are coupled by a fiber coupler together to provide pumping energy for a line of erbium-doped fiber. When one pump laser fails, the other pump laser can still provide energy to the two lines of erbium-doped fiber, so that the two lines of EDFA modules can still maintain a certain amplification function.

Figure 5:
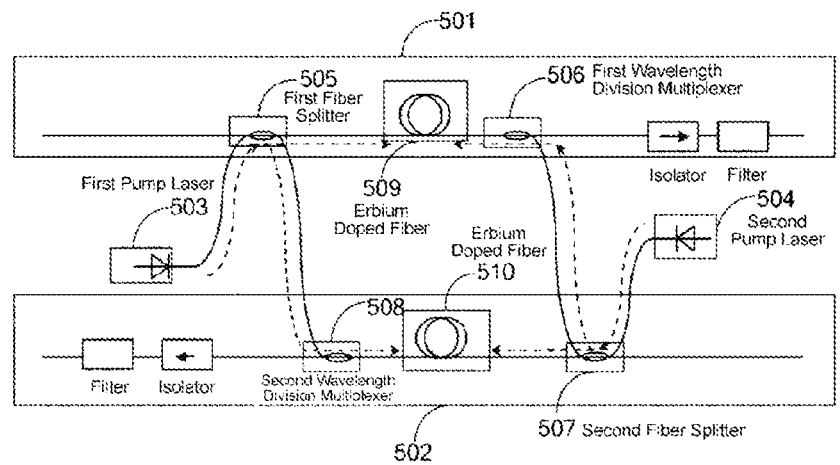
FIG. 5 is a schematic diagram showing a pump redundant solution of another single fiber pair 2×2 architecture in the prior art.

FIG. 5 shows another pump redundant design solution of a single fiber pair 2×2 architecture (2 pump lasers×2 optical fibers). The first pumping laser is divided into a first sub-pumping laser and a second sub-pumping laser that are respectively input into the erbium-doped fiber in the two optical fibers. The second pumping laser is divided into a third sub-pumping laser and fourth sub-pumping laser that are respectively input into the erbium-doped fiber in the two optical fibers. When one pump laser fails, the other pump laser can still provide energy to the two lines of erbium-doped fiber, so that the two lines of EDFA modules can still maintain a certain amplification function.

In this solution, the system reliability is low, and at most one pump laser is allowed to fail. When the two pump lasers supporting the same fiber pair fail at the same time, both of the two lines of EDFA modules on the fiber pair will be unable to work, thus system service interruption will be caused.

Additionally, FIG. 1 shows a pump redundant design solution of a single fiber pair 4×2 architecture (4 pump lasers×2 optical fibers). In such a pump redundant design solution, the number of the pump lasers is twice that of the EDFA modules. Because each fiber pair corresponds to 2 EDFA modules, each time a fiber pair is added, the number of the pump lasers needs to be multiplied, thereby causing a high cost.

In conclusion, by the above several pump redundant design solutions, pump sharing on any fiber pair cannot be realized in a multi-fiber pair application scene. Therefore, the invention provides a novel pump redundant design solution, by which pump sharing between any fiber pair in a multi-fiber pair application scene can be realized. Moreover, under the premise that the number of the pump lasers is not increased, each line of EDFA may simultaneously have the pumping light input from 4 pump lasers, and 4×4 pump redundant may be realized.

Figure 6:
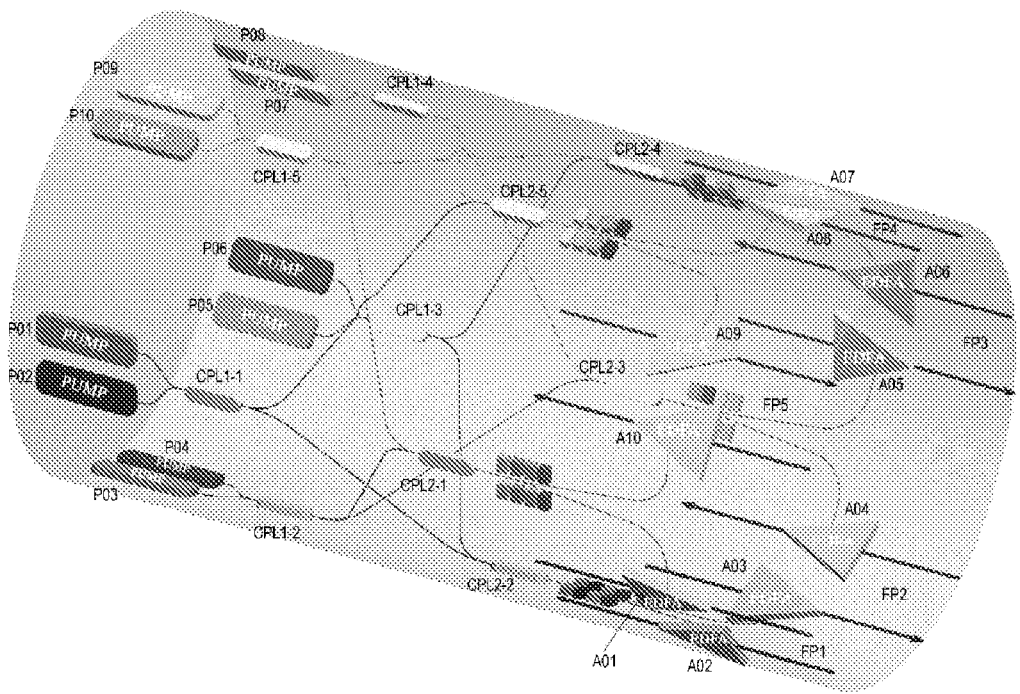
FIG. 6 is a three-dimensional structure diagram of a submarine network device in a 5-fiber pair scene according to an embodiment of the invention.

Referring to FIG. 6, FIG. 6 is a three-dimensional structure diagram of a submarine optical repeater according to one embodiment of the invention, wherein the apparatus of the submarine optical repeater includes: a fiber, a pump laser, an EDFA, a primary CPL and a secondary CPL.

Because the invention is mainly applied to a multi-fiber pair scene, generally, for distinguishing from the prior-art solution, at least a 3-fiber pair (six optical fibers) application scene, the number of the above pump lasers, primary CPLs and secondary CPLs is no less than 3, and the number of the above EDFAs should correspond to that of the fiber pairs, that is, each optical fiber should correspondingly have one EDFA, thus the number of EDFAs is no less than 6. It should be noted that, the above primary CPL and secondary CPL may be CPLs of the same structure, and it is only distinguished from the functions in this solution. Specifically, the primary CPL and the secondary CPL in the invention may be a CPL that includes 2 input ports and 2 output ports and has a port loss of 3 dB.

Figure 16:
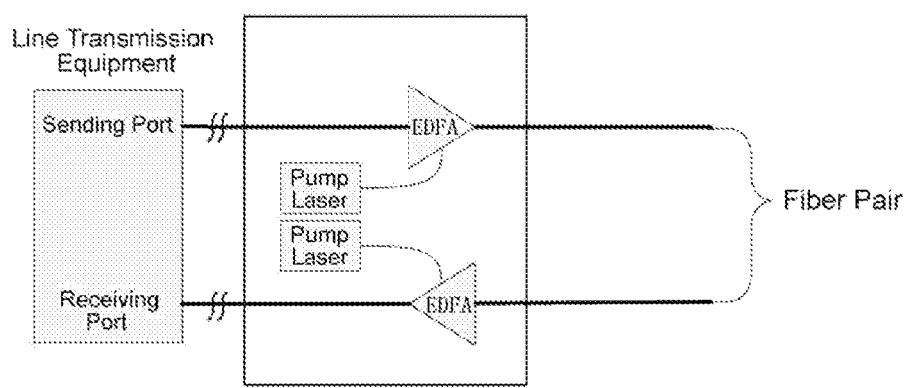
FIG. 16 is a schematic diagram of a fiber pair according to an embodiment of the invention.

Referring to FIG. 16, as an example, a fiber pair (FP) refers to two optical fibers connected with the receiving port and the sending port of a line transmission equipment (LTE), and the two optical fibers form a communication link with one line for receiving and the other line for sending. Different fiber pairs are isolated from each other, that is, no physical connection exists between different fiber pairs.

The positional relationship and the function of each of the above apparatus will be further described below.

Figure 7:
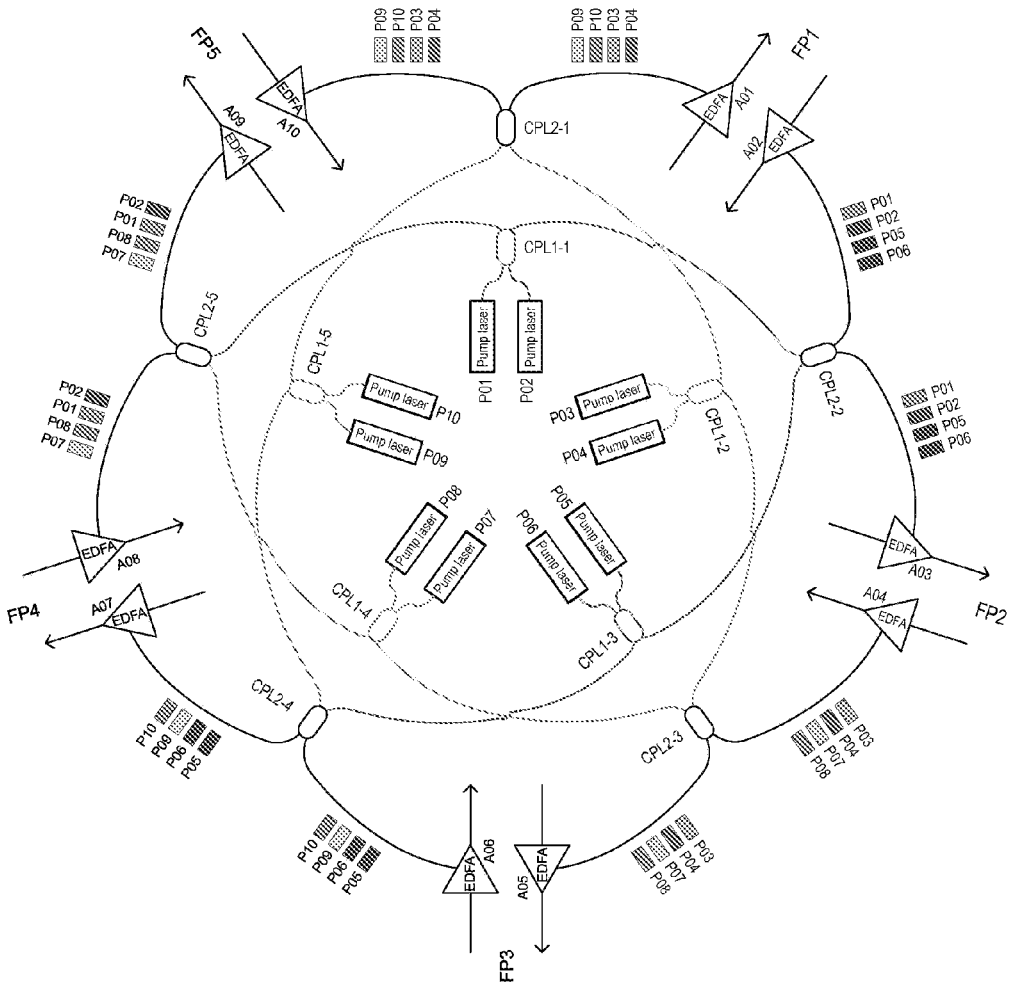
FIG. 7 is an unfolded plan view showing a submarine network device in a 5-fiber pair scene according to an embodiment of the invention.

For ease of understanding, referring to FIG. 7, FIG. 7 is an unfolded plan view of the above FIG. 6. The pump laser, the EDFA, the primary CPL and the secondary CPL are separately disposed in different planes. Moreover, each pump laser, each EDFA, each primary CPL and each secondary CPL are arranged annually to form a closed structure. The input port of each primary CPL is at least connected with a pump laser (for example, as shown in FIG. 6 or FIG. 7, the input port of each primary CPL may be connected with two pump lasers), and the output port of each secondary CPL is connected with two EDFAs. Each primary CPL in the primary CPL set is adjacent to the other 2 primary CPLs in the primary CPL set, and each secondary CPL in the secondary CPL set is adjacent to the other 2 secondary CPLs in the secondary CPL set. The output port of the primary CPL is cross-connected with the input port of the secondary CPL via a fiber, the two different the secondary CPLs connected with each primary CPL are spaced by a secondary CPL, and the two different primary CPLs connected with each secondary CPL are spaced by a primary CPL. Additionally, each primary CPL has a secondary CPL arranged symmetrically thereto, that is, the primary CPL and the secondary CPL may be on the same axis, and the axis is respectively vertical to the plane on which each primary CPL and each secondary CPL exists.

The pump laser is configured to emit pumping laser. The primary CPL is configured to couple the received pumping laser and outputting two lines of primary pumping laser, and the two lines of primary pumping laser are respectively output to two different secondary CPLs. Because the output port of the primary CPL is cross-connected with the input port of the secondary CPL via a fiber, the two secondary CPLs are spaced by another secondary CPL. The secondary CPL is configured to couple the received primary pumping laser and output two lines of secondary pumping laser to two different EDFAs.

It should be noted that, each of the above apparatus is connected via a fiber.

It should be noted that, the EDFA includes an input port, an output port and a pump power input terminal, wherein signal light is input from the input port of the EDFA via a fiber, the secondary pumping laser output by the secondary CPL is input into the EDFA from the pump power input terminal, and the optical signal processed by the EDFA is output from the output port of the EDFA via the fiber.

According to the solutions described in the invention, arbitrary 3 primary CPLs and 3 secondary CPLs arranged symmetrically thereto will be taken for further describing the connection relationship between the primary CPL and the secondary CPL.

Figure 8:
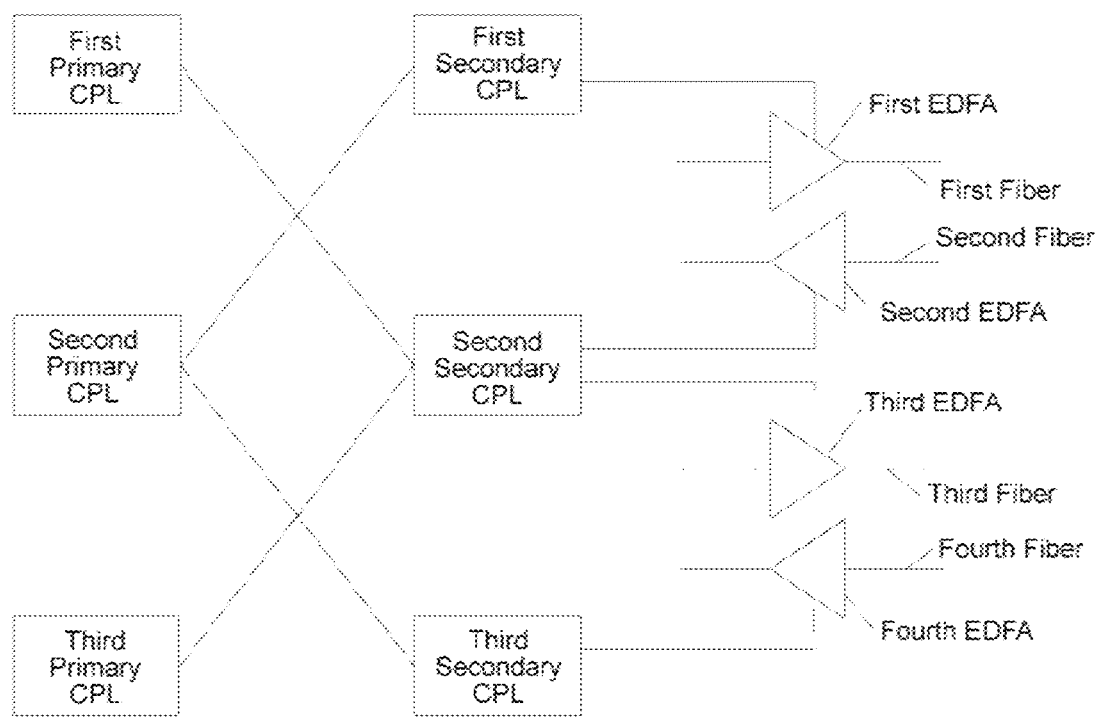
FIG. 8 is a schematic diagram showing the connection between the internal apparatus of a submarine network device according to an embodiment of the invention.

Referring to FIG. 8, the arbitrary three primary CPLs are respectively a first primary CPL, a second primary CPL and a third primary CPL, and the three secondary CPLs arranged symmetrically thereto are respectively a first secondary CPL, a second secondary CPL and a third secondary CPL, wherein the second primary CPL is respectively adjacent to the first primary CPL and the third primary CPL, and the second secondary CPL is respectively adjacent to the first secondary CPL and the third secondary CPL. The output port of the first primary CPL is connected with the input port of the second secondary CPL, the output port of the second primary CPL is connected with the input port of the first secondary CPL, the output port of the second primary CPL is connected with the input port of the third secondary CPL, and the output port of the third primary CPL is connected with the input port of the second secondary CPL. The output port of the first secondary CPL is connected with the pump power input terminal of the first EDFA, the output port of the second secondary CPL is connected with the pump power input terminal of the second EDFA, the output port of the second secondary CPL is connected with the pump power input terminal of the third EDFA, and the output port of the third secondary CPL is connected with the pump power input terminal of the fourth EDFA.

It should be noted that, the submarine optical repeater according to an embodiment of the invention does not necessarily has the cylinder structure shown in FIG. 5, and there may be other external structures packaging each of the above internal apparatus, for example, it may be a cuboid structure, which is not limited here.

It may be understood that, in practical application, the number of the primary CPLs and the secondary CPLs is generally no less than 3, but it is not strictly limited. In the embodiment shown in FIG. 8, arbitrary three groups of corresponding primary CPLs and secondary CPLs are selected, and the connection relationship therebetween is described, rather than showing the complete structure of the submarine optical repeater according to the invention. The complete structure of the submarine optical repeater according to the invention will be further described below in conjunction with different numbers of multi-fiber pair scenes.

Figure 9:
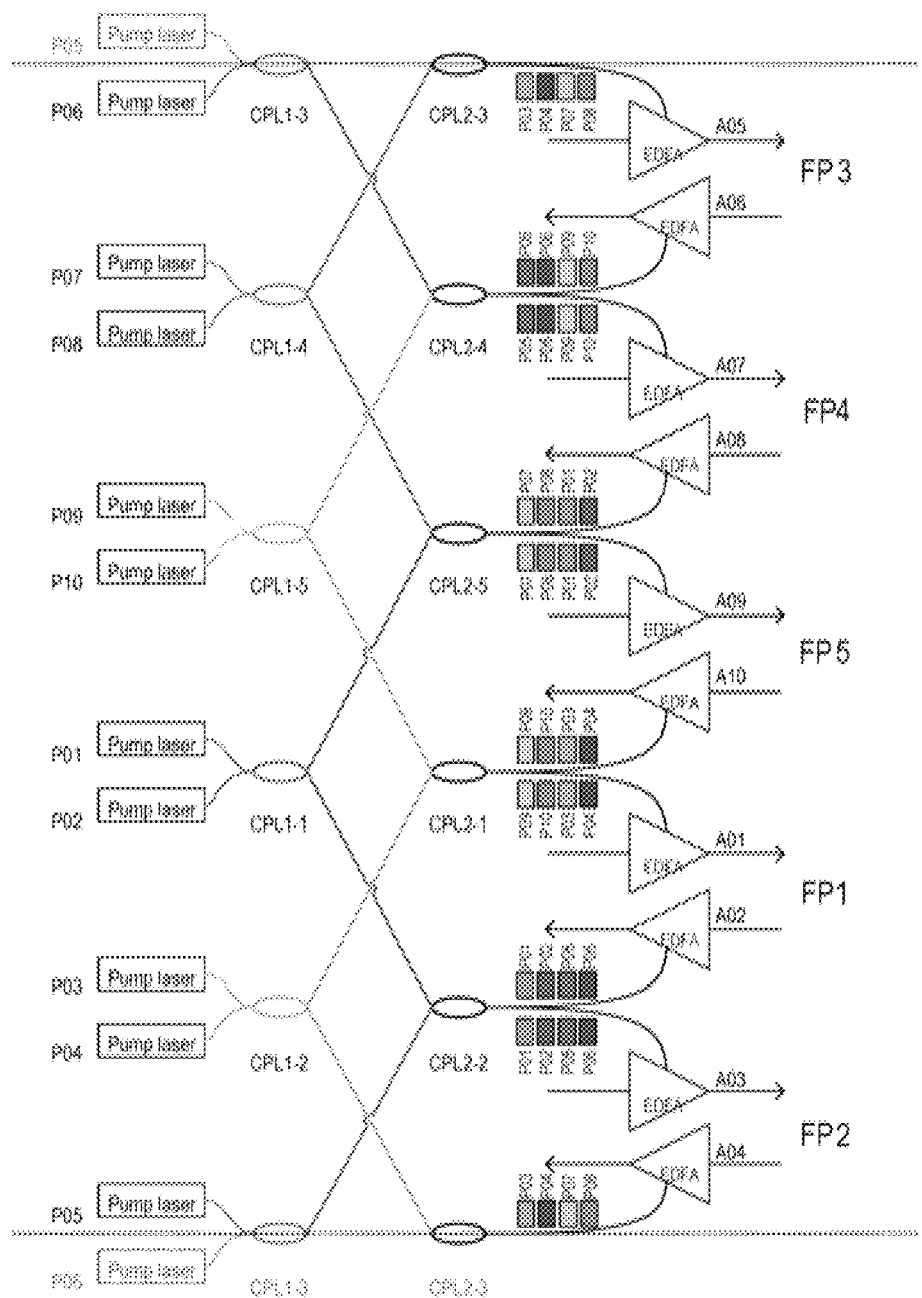
FIG. 9 is a side exploded view of a submarine network device in a 5-fiber pair scene according to an embodiment of the invention.

Referring to FIG. 9, FIG. 9 is a side exploded view of the above FIG. 6, and it corresponds to the structure of a submarine optical repeater in a 5-fiber pair application scene according to an embodiment of the invention, which includes: 10 pump lasers (P01 to P10), 5 primary CPLs (CPL1-1 to CPL1-5), 5 secondary CPLs (CPL2-1 to CPL2-5) and 10 EDFA modules (A01 to A10).

Every 2 pump lasers form a group, and the input port of each primary CPL is connected with a group of pump lasers. Specifically, the input port of CPL1-1 is connected with P01 and P02, the input port of CPL1-2 of CPL1-2 is connected with P03 and P04, the input port of CPL1-3 is connected with P05 and P06, the input port of CPL1-4 is connected with P07 and P08, and the input port of CPL1-5 is connected with P09 and P10.

The connection mode between the primary CPL and the secondary CPL is specifically as follows: the output port of CPL1-1 is respectively connected to the input port of CPL2-2 and the input port of CPL2-5, the output port of CPL1-2 is respectively connected to the input port of CPL2-1 and the input port of CPL2-3, the output port of CPL1-3 is respectively connected to the input port of CPL2-2 and the input port of CPL2-4, the output port of CPL1-4 is respectively connected to the input port of CPL2-3 and the input port of CPL2-5, and the output port of CPL1-5 is respectively connected to the input port of CPL2-1 and the input port of CPL2-4.

The output port of each secondary CPL is connected with 2 EDFAs. Specifically, the output port of CPL2-1 is connected with A01 and A10, the output port of CPL2-2 is connected with A02 and A03, the output port of CPL2-3 is connected with A04 and A05, the output port of CPL2-4 is connected with A06 and A07, and the output port of CPL2-5 is connected with A08 and A09.

It should be noted that, according to an embodiment of the invention, each EDFA corresponds to one optical fiber, and the fiber is connected with the input port and the output port of the EDFA. 2 different secondary CPLs are connected with two optical fibers corresponding to the 2 EDFAs to form a fiber pair. Specifically, the fibers corresponding to A01 and A02 form a fiber pair FP1, the fibers corresponding to A03 and A04 form a fiber pair FP2, the fibers corresponding to A05 and A06 form a fiber pair FP3, the fibers corresponding to A07 and A08 form a fiber pair FP4, and the fibers corresponding to A09 and A10 form a fiber pair FP5.

Further description will be given below in conjunction with the function of each of the above apparatus.

The two lines of pumping laser emitted by each group of pump laser are coupled via the primary CPL, then the primary CPL outputs two lines of primary pumping laser, and each line of primary pumping laser includes 50% of the energy of each of the group of (2) pump lasers. For example, the pumping light of P01 and P02 is input to CPL1-1, and then CPL1-1 respectively outputs 50% of the energy of each of P01 and P02 to CPL2-2 and CPL2-5. That is, CPL1-1 receives 100% of the energy of P01 and 100% of the energy of P02, CPL2-2 receives 50% of the energy of P01 and 50% of the energy of P02, and CPL2-5 also receives 50% of the energy of P01 and 50% of the energy of P02.

The primary pumping laser output by 2 different primary CPLs is coupled by the secondary CPL, the secondary CPL outputs 2 lines of secondary pumping laser. Each line of secondary pumping laser provides energy to 1 EDFA, and each line of secondary pumping laser includes 25% of the energy of each of the 4 pump lasers. For example, CPL2-1 receives 2 lines of primary pumping laser output by CPL1-2 and CPL1-5. That is, CPL2-1 receives 50% of the energy of each of P03, P04, P09 and P10. CPL2-1 outputs 2 lines of secondary pumping laser respectively to A01 and A10, and each line of secondary pumping laser includes 25% of the energy of each of P03, P04, P09 and P10.

It should be noted that, in this solution, it may be judged which group of pump lasers operate abnormally by detecting the variation of the output power of EDFA. For example: A01, A10 and A04, A05 have the same power reduction, it may be seen via reverse pushback that a group of pump lasers jointly providing energy to A01, A10, A04 and A05 are respectively P03 and P04, thus it may be judged that the pump laser P03 or P04 connected with CPL1-2 operates abnormally.

It should be noted that, in this solution, the two lines of primary pumping laser output by each primary CPL and the two lines of secondary pumping laser output by each secondary CPL are both coupled in a ratio of 1:1. Additionally, in practical application, the ratio of the two lines of pumping laser output may also be adjusted according to different requirements, which is not limited here. For example, the pumping light of P01 and P02 is input to CPL1-1, then CPL1-1 outputs 30% of the energy of P01 and 70% of the energy of P02 to CPL2-2, and CPL1-1 outputs 70% of the energy of P01 and 30% of the energy of P02 to CPL2-5.

In an embodiment of the invention, the pumping laser energy of each line of EDFA is jointly provided by four pump lasers corresponding thereto, and each pump laser contributes 25% of the energy. In this solution, at most three of the pump lasers thereof may be allowed to fail, and the EDFA module can still maintain a certain amplification function, thereby improving the system reliability. Moreover, the number of the pump lasers is the same as that of the EDFAs, thus the number of the pump lasers used is small, the cost is low, the overall power consumption is small, and the overall heat consumption is small. Additionally, it may be judged which group of pump lasers operates abnormally by detecting the variation of the output power of EDFA, which may be helpful to the maintenance of the system.

Figure 10:
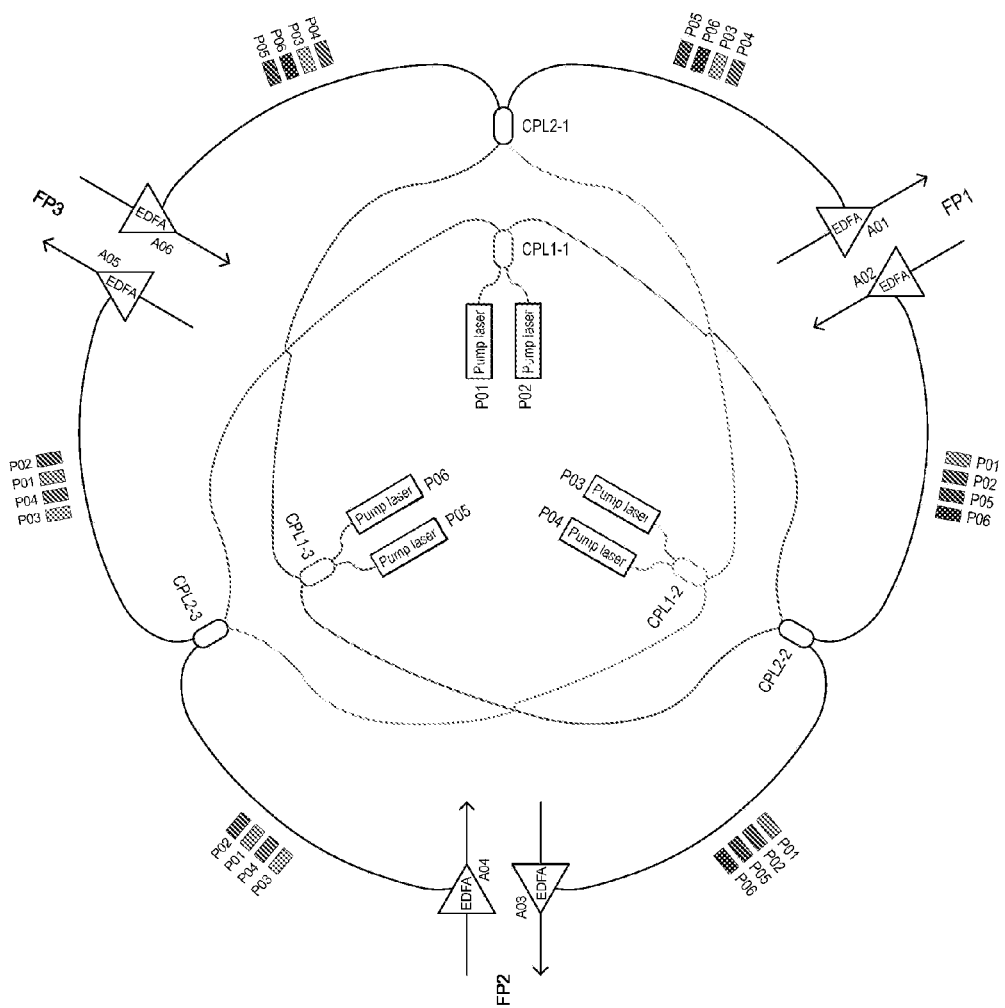
FIG. 10 is an unfolded view of a submarine network device in a 3-fiber pair scene according to an embodiment of the invention.

Referring to FIG. 10, FIG. 10 corresponds to a structure of a submarine optical repeater in a 3-fiber pair application scene according to an embodiment of the invention. The submarine optical repeater includes: 6 pump lasers (P01 to P06), 3 primary CPLs (CPL1-1 to CPL1-3), 3 the secondary CPLs (CPL2-1 to CPL2-3) and 6 EDFA modules (A01 to A06).

Every 2 pump lasers form a group, and the input port of each primary CPL is connected with a group of pump lasers. Specifically, the input port of CPL1-1 is connected with P01 and P02, the input port of CPL1-2 is connected with P03 and P04, and the input port of CPL1-3 is connected with P05 and P06.

The connection mode between the primary CPL and the secondary CPL is specifically as follows: the output port of CPL1-1 is respectively connected to the input port of CPL2-2 and the input port of CPL2-3, the output port of CPL1-2 is respectively connected to the input port of CPL2-1 and the input port of CPL2-3, and the output port of CPL1-3 is respectively connected to the input port of CPL2-1 and the input port of CPL2-2.

The output port of each secondary CPL is connected with 2 EDFAs. Specifically, the output port of CPL2-1 is connected with A01 and A06, the output port of CPL2-2 is connected with A02 and A03, and the output port of CPL2-3 is connected with A04 and A05.

It should be noted that, in an embodiment of the invention, each EDFA corresponds to one optical fiber, the fiber is connected with the input port and the output port of the EDFA, and 2 different secondary CPLs are connected with two optical fibers corresponding to the 2 EDFAs to form a fiber pairs. Specifically, the fibers corresponding to A01 and A02 form a fiber pair FP1, the fibers corresponding to A03 and A04 form a fiber pair FP2, and the fibers corresponding to A05 and A06 form a fiber pair FP3.

Further description will be given below in conjunction with the function of each of the above apparatus.

The two lines of pumping laser emitted by each group of pump laser are coupled via the primary CPL, then the primary CPL outputs two lines of primary pumping laser, and each line of primary pumping laser includes 50% of the energy of each of the group of (2) pump lasers. For example, the pumping light of P01 and P02 is input to CPL1-1, and then the CPL1-1 respectively outputs 50% of the energy of each of P01 and P02 to CPL2-2 and CPL2-3. That is, CPL1-1 receives 100% of the energy of P01 and 100% of the energy of P02, CPL2-2 receives 50% of the energy of P01 and 50% of the energy of P02, and CPL2-3 also receives 50% of the energy of P01 and 50% of the energy of P02.

The primary pumping laser output by 2 different primary CPLs is coupled by the secondary CPL, the secondary CPL outputs 2 lines of secondary pumping laser, each line of secondary pumping laser provides energy to 1 EDFA, and each line of secondary pumping laser includes 25% of the energy of each of the 4 pump lasers. For example, CPL2-1 receives 2 lines of primary pumping laser output by CPL1-2 and CPL1-3, that is, CPL2-1 receives 50% of the energy of each of P03, P04, P05 and P06, CPL2-1 respectively outputs 2 lines of secondary pumping laser to A01 and A06, and each line of secondary pumping laser includes 25% of the energy of each of P03, P04, P05 and P06.

It should be noted that, in this solution, it may be judged which group of pump lasers operate abnormally by detecting the variation of the output power of EDFA. For example, A01, A06 and A04, A05 have the same power reduction, and it may be seen via reverse deduction that a group of pump lasers jointly providing energy to A01, A06, A04 and A05 are respectively P03 and P04, thus it may be judged that the pump laser P03 or P04 connected with CPL1-2 operates abnormally.

It should be noted that, in this solution, the two lines of primary pumping laser output by each primary CPL and the two lines of secondary pumping laser output by each secondary CPL are both coupled in a ratio of 1:1. Additionally, in practical application, the ratio of the two lines of pumping laser output may also be adjusted according to different requirements, which is not limited here. For example, the pumping light of P01 and P02 is input to CPL1-1, then CPL1-1 outputs 30% of the energy of P01 and 70% of the energy of P02 to CPL2-2, and CPL1-1 outputs 70% of the energy of P01 and 30% of the energy of P02 to CPL2-5.

Figure 11:
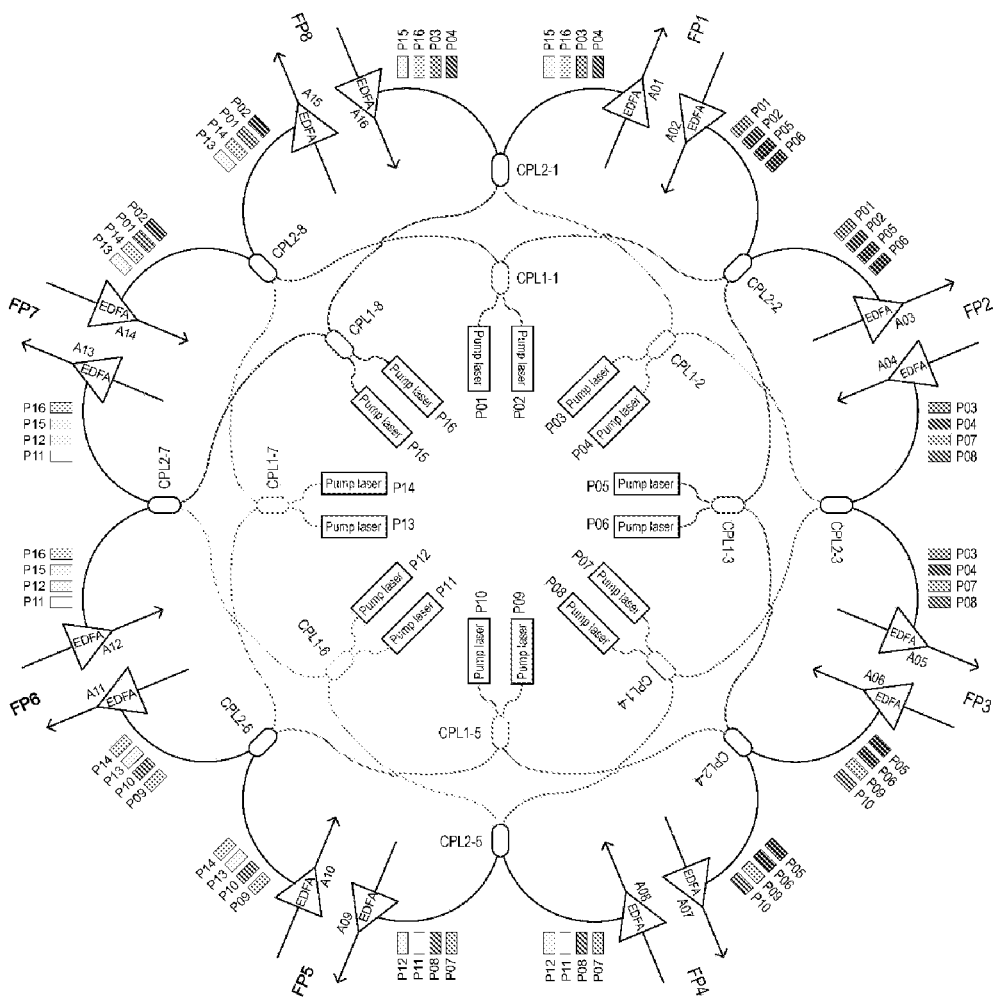
FIG. 11 is an unfolded plan view of a submarine network device in an 8-fiber pair scene according to an embodiment of the invention.

Referring to FIG. 11, FIG. 11 corresponds to a structure of a submarine optical repeater in an 8-fiber pair application scene according to an embodiment of the invention. The submarine optical repeater includes: 16 pump lasers (P01 to P16), 8 primary CPLs (CPL1-1 to CPL1-8), 8 secondary CPLs (CPL2-1 to CPL2-8) and 16 EDFA modules (A01 to A16).

Every 2 pump lasers form a group, and the input port of each primary CPL is connected with a group of pump lasers. Specifically, the input port of CPL1-1 is connected with P01 and P02, the input port of CPL1-2 is connected with P03 and P04, the input port of CPL1-3 is connected with P05 and P06, the input port of CPL1-4 is connected with P07 and P08, the input port of CPL1-5 is connected with P09 and P10, the input port of CPL1-6 is connected with P11 and P12, the input port of CPL1-7 is connected with P13 and P14, and the input port of CPL1-8 is connected with P15 and P16.

The connection mode between the primary CPL and the secondary CPL is specifically as follows: the output port of CPL1-1 is respectively connected to the input port of CPL2-2 and the input port of CPL2-8, the output port of CPL1-2 is respectively connected to the input port of CPL2-1 and the input port of CPL2-3, the output port of CPL1-3 is respectively connected to the input port of CPL2-2 and the input port of CPL2-4, the output port of CPL1-4 is respectively connected to the input port of CPL2-3 and the input port of CPL2-5, the output port of CPL1-5 is respectively connected to the input port of CPL2-4 and the input port of CPL2-6, the output port of CPL1-6 is respectively connected to the input port of CPL2-5 and the input port of CPL2-7, the output port of CPL1-7 is respectively connected to the input port of CPL2-6 and the input port of CPL2-8, and the output port of CPL1-8 is respectively connected to the input port of CPL2-7 and the input port of CPL2-1.

The output port of each secondary CPL is connected with 2 EDFAs. Specifically, the output port of CPL2-1 is connected with A01 and A16, the output port of CPL2-2 is connected with A02 and A03, the output port of CPL2-3 is connected with A04 and A05, the output port of CPL2-4 is connected with A06 and A07, the output port of CPL2-5 is connected with A08 and A09, the output port of CPL2-6 is connected with A10 and A11, the output port of CPL2-7 is connected with A12 and A13, and the output port of CPL2-8 is connected with A14 and A15.

It should be noted that, in an embodiment of the invention, each EDFA corresponds to one optical fiber, and the fiber is connected with the input port and the output port of the EDFA, 2 different secondary CPLs are connected with two optical fibers corresponding to the 2 EDFAs to form a fiber pairs. Specifically, the fibers corresponding to A01 and A02 form a fiber pair FP1, the fibers corresponding to A03 and A04 form a fiber pair FP2, the fibers corresponding to A05 and A06 form a fiber pair FP3, the fibers corresponding to A07 and A08 form a fiber pair FP4, the fibers corresponding to A09 and A10 form a fiber pair FP5, the fibers corresponding to A11 and A12 form a fiber pair FP6, the fibers corresponding to A13 and A14 form a fiber pair FP7, and the fibers corresponding to A15 and A16 form a fiber pair FP8.

Further description will be given below in conjunction with the function of each of the above apparatus.

The two lines of pumping laser emitted by each group of pump laser are coupled via the primary CPL, then the primary CPL outputs two lines of primary pumping laser, and each line of primary pumping laser includes 50% of the energy of each of the group of (2) pump lasers. For example, the pumping light of P01 and P02 is input to CPL1-1, and then CPL1-1 respectively outputs 50% of the energy of each of P01 and P02 to CPL2-2 and CPL2-8. That is, CPL1-1 receives 100% of the energy of P01 and 100% of the energy of P02, CPL2-2 receives 50% of the energy of P01 and 50% of the energy of P02, and CPL2-8 also receives 50% of the energy of P01 and 50% of the energy of P02.

The primary pumping laser output by 2 different primary CPLs is coupled by the secondary CPL, the secondary CPL outputs 2 lines of secondary pumping laser, each line of secondary pumping laser provides energy to 1 EDFA, and each line of secondary pumping laser includes 25% of the energy of each of the 4 pump lasers. For example, CPL2-1 receives 2 lines of primary pumping laser output by CPL1-2 and CPL1-8, that is, CPL2-1 receives 50% of the energy of each of P03, P04, P15 and P16, CPL2-1 respectively outputs 2 lines of secondary pumping laser to A01 and A16, and each line of secondary pumping laser includes 25% of the energy of each of P03, P04, P15 and P16.

It should be noted that, in this solution, it may be judged which group of pump lasers operate abnormally by detecting the variation of the output power of EDFA. For example, A01, A16 and A04, A05 have the same power reduction, and it may be seen via reverse deduction that a group of pump lasers jointly providing energy to A01, A16, A04 and A05 are respectively P03 and P04, thus it may be judged that the pump laser P03 or P04 connected with CPL1-2 operates abnormally.

It should be noted that, in this solution, the two lines of primary pumping laser output by each primary CPL and the two lines of secondary pumping laser output by each secondary CPL are both coupled in a ratio of 1:1. Additionally, in practical application, the ratio of the two lines of pumping laser output may also be adjusted according to different requirements, which is not limited here. For example, the pumping light of P01 and P02 is input to CPL1-1, then CPL1-1 outputs 30% of the energy of P01 and 70% of the energy of P02 to CPL2-2, and CPL1-1 outputs 70% of the energy of P01 and 30% of the energy of P02 to CPL2-5.

The embodiments shown in the above FIG. 9 to FIG. 11 all describe the scenes in which 2 different secondary CPLs are connected with two optical fibers corresponding to the 2 EDFAs to form a fiber pairs, and additionally, this solution may also be a scene in which the same secondary CPL is connected with two optical fibers corresponding to the 2 EDFAs to form a fiber pairs. The structure of such a submarine optical repeater will be introduced below still by an example of 5-fiber pair application scene.

Figure 12:
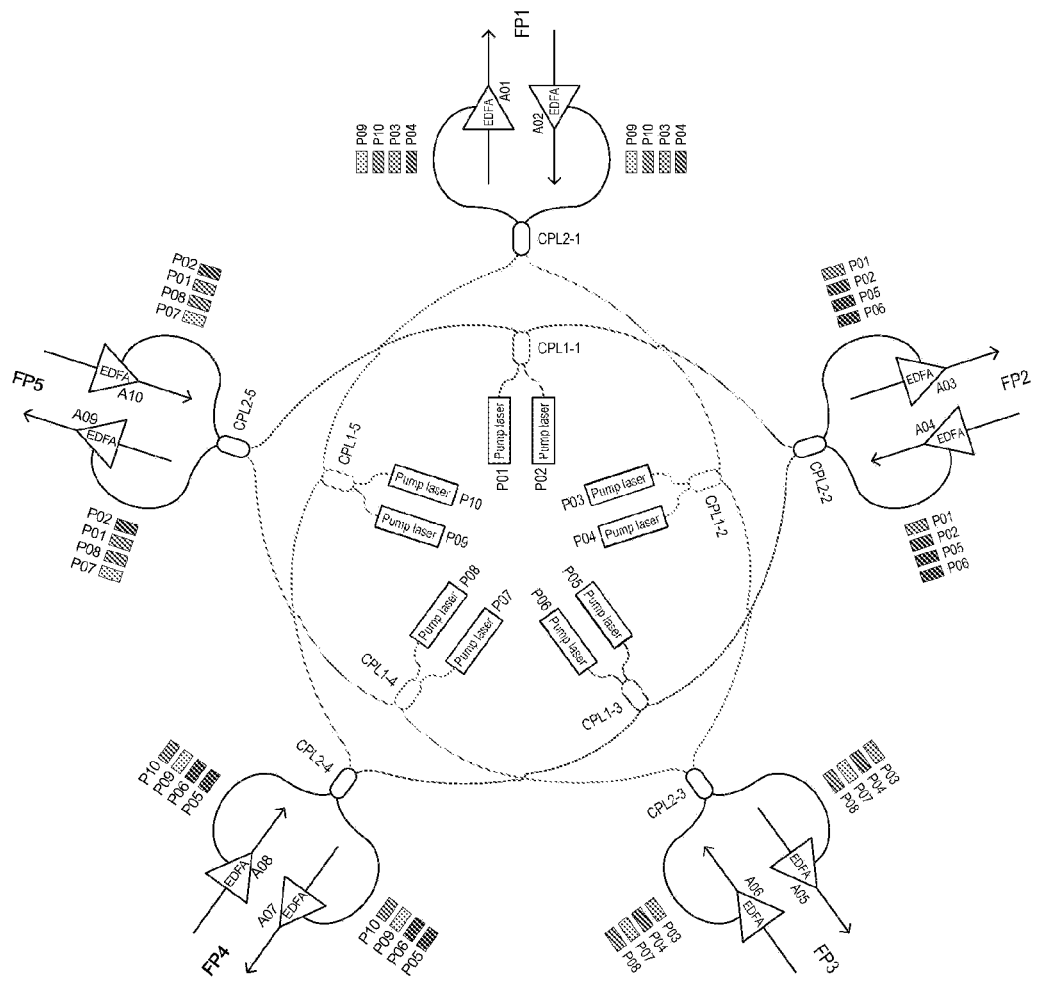
FIG. 12 is an unfolded view of another submarine network device in a 5-fiber pair scene according to an embodiment of the invention.

Referring to FIG. 12, the submarine optical repeater according to the embodiment of the invention includes: 10 pump lasers (P01 to P10), 5 primary CPLs (CPL1-1 to CPL1-5), 5 secondary CPLs (CPL2-1 to CPL2-5) and 10 EDFA modules (A01 to A10).

Every 2 pump lasers form a group, and the input port of each primary CPL is connected with a group of pump lasers. Specifically, the input port of CPL1-1 is connected with P01 and P02, the input port of CPL1-2 of CPL1-2 is connected with P03 and P04, the input port of CPL1-3 is connected with P05 and P06, the input port of CPL1-4 is connected with P07 and P08, and the input port of CPL1-5 is connected with P09 and P10.

The connection mode between the primary CPL and the secondary CPL is specifically as follows: the output port of CPL1-1 is respectively connected to the input port of CPL2-2 and the input port of CPL2-5, the output port of CPL1-2 is respectively connected to the input port of CPL2-1 and the input port of CPL2-3, the output port of CPL1-3 is respectively connected to the input port of CPL2-2 and the input port of CPL2-4, the output port of CPL1-4 is respectively connected to the input port of CPL2-3 and the input port of CPL2-5, and the output port of CPL1-5 is respectively connected to the input port of CPL2-1 and the input port of CPL2-4.

The output port of each secondary CPL is connected with 2 EDFAs. Specifically, the output port of CPL2-1 is connected with A01 and A02, the output port of CPL2-2 is connected with A03 and A04, the output port of CPL2-3 is connected with A05 and A06, the output port of CPL2-4 is connected with A07 and A08, and the output port of CPL2-5 is connected with A09 and A10; wherein the fibers corresponding to A01 and A02 form a fiber pair FP1, the fibers corresponding to A03 and A04 form a fiber pair FP2, the fibers corresponding to A05 and A06 form a fiber pair FP3, the fibers corresponding to A07 and A08 form a fiber pair FP4, and the fibers corresponding to A09 and A10 form a fiber pair FP5.

Thus, it may be seen that, the fibers corresponding to two EDFAs connected with each secondary CPL form a fiber pairs, which is different from the solutions of the embodiments shown in FIG. 9 to FIG. 11.

The above embodiments all describe scenes in which the input port of each primary CPL is connected with two pump lasers. Additionally, the input port of each primary CPL may also be connected with other number of pump lasers, which will be described in detail below.

Figure 13:
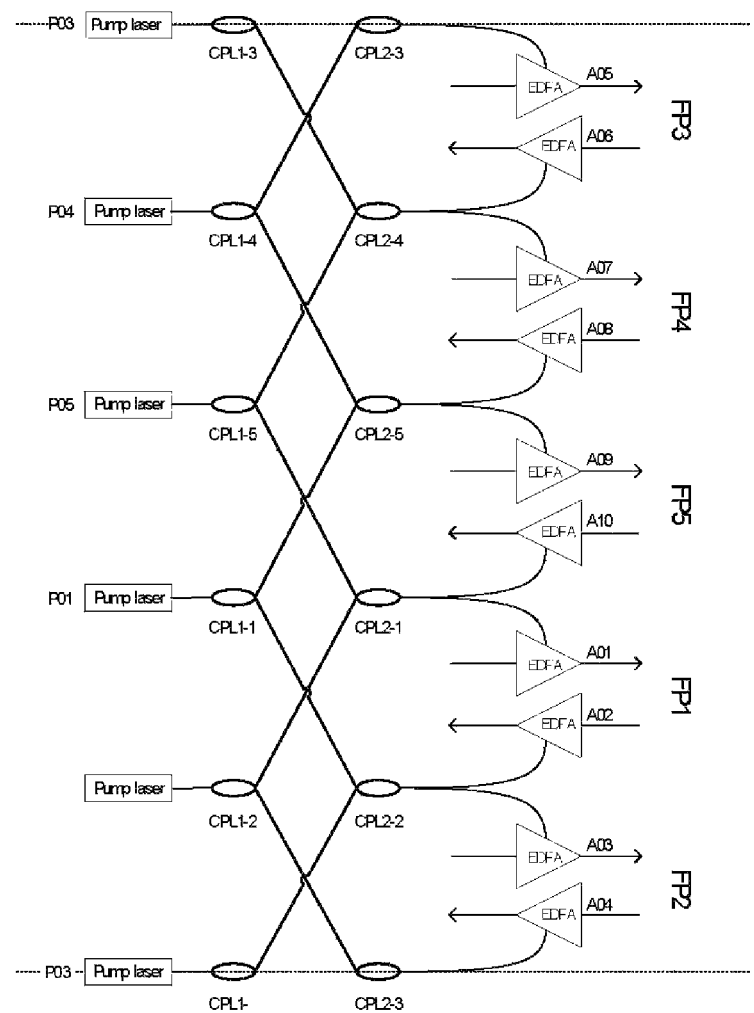
FIG. 13 is a side exploded view of another submarine network device in a 5-fiber pair scene according to an embodiment of the invention.

Referring to FIG. 13, FIG. 13 also shows a structure of a submarine optical repeater in a 5-fiber pair application scene according to an embodiment of the invention. The submarine optical repeater includes: 5 pump lasers (P01 to P05), 5 primary CPLs (CPL1-1 to CPL1-5), 5 secondary CPLs (CPL2-1 to CPL2-5) and 10 EDFA modules (A01 to A10).

This embodiment differs from the embodiment of FIG. 9 in that the input port of each primary CPL is connected with one pump laser. Specifically, the input port of CPL1-1 is connected with P01, the input port of CPL1-2 is connected with P02, the input port of CPL1-3 is connected with P03, the input port of CPL1-4 is connected with P04, and the input port of CPL1-5 is connected with P05.

The description of other parts of the structure in this embodiment is similar to that of the embodiment shown in FIG. 9, and no repeated description will be given again here.

Figure 14:
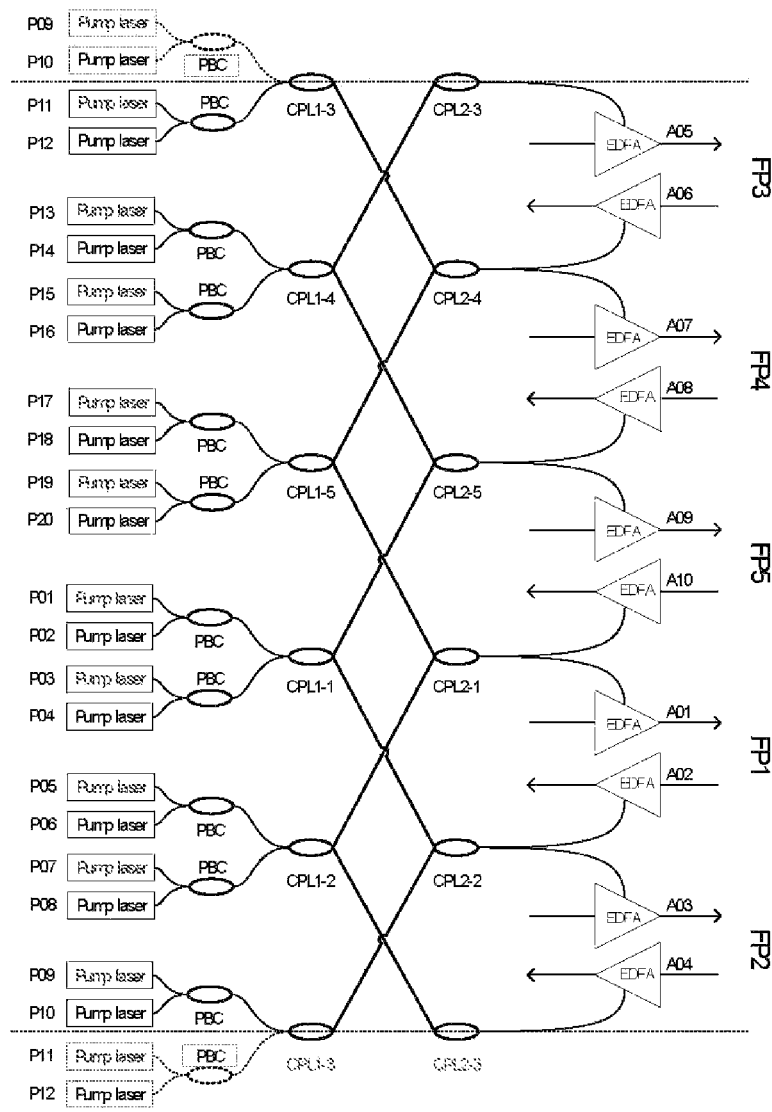
FIG. 14 is a side exploded view of another submarine network device in a 5-fiber pair scene according to an embodiment of the invention.

Referring to FIG. 14, FIG. 14 also shows a structure of a submarine optical repeater in a 5-fiber pair application scene according to an embodiment of the invention. The submarine optical repeater includes: 20 pump lasers (P01 to P20), 5 primary CPLs (CPL1-1 to CPL1-5), 5 secondary CPLs (CPL2-1 to CPL2-5), 10 EDFA modules (A01 to A10) and 10 polarization beam combiners (PBCs).

Each primary CPL may receive the energy provided by 4 pump lasers. Specifically, every 2 pump lasers form a group, the output port of each group of pump lasers is connected to the input port of 1 PBC, and the input port of each primary CPL is connected with 2 different PBCs, wherein the PBC may combine two beams of polarized light orthogonal in the polarization direction into one beam. For example, the PBC may combine the pumping light output by two pump lasers P01 and P02 into one beam and output it to CPL1-1, while the other PBC may combine the pumping light output by two pump lasers P03 and P04 into one beam and similarly output it to CPL1-1.

The description of other parts of the structure in this embodiment is similar to that of the embodiment shown in FIG. 9, and no repeated description will be given again here.

It should be noted that, the CPL in the submarine optical repeater described in the above embodiments is divided into a primary CPL and a secondary CPL. Additionally, in this solution, a tertiary CPL may further be added on this basis, which will be described in detail below.

Figure 15:
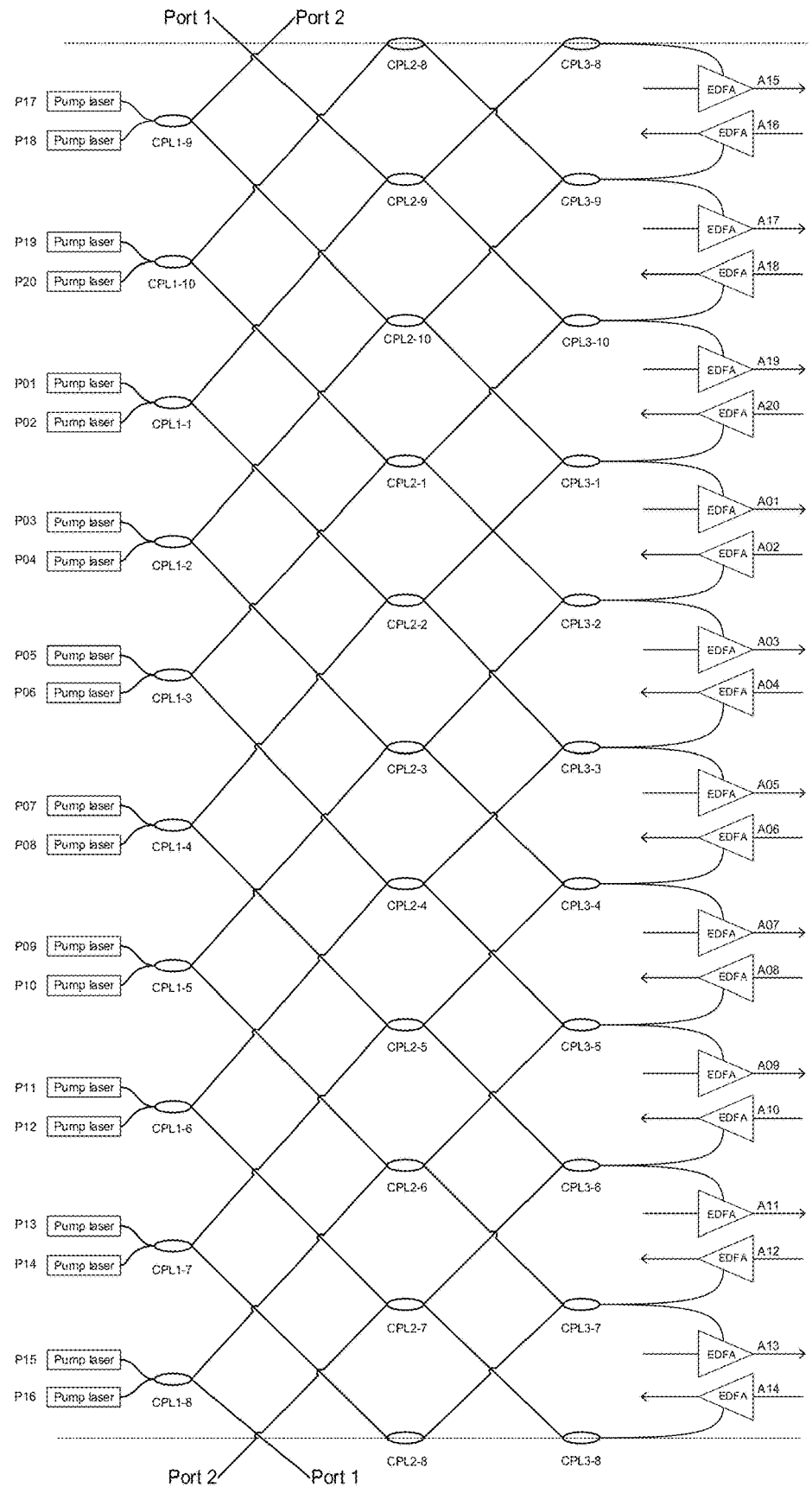
FIG. 15 is a side exploded view of a submarine network device in a 10-fiber pair scene according to an embodiment of the invention.

Referring to FIG. 15, FIG. 15 shows a structure of a submarine optical repeater in a 10-fiber pair application scene according to an embodiment of the invention. The submarine optical repeater includes: 20 pump lasers (P01 to P20), 10 primary CPLs (CPL1-1 to CPL1-10), 10 secondary CPLs (CPL2-1 to CPL2-10), 10 tertiary CPLs (CPL3-1 to CPL3-10) and 20 EDFA modules (A01 to A20).

The pump laser, the EDFA, the primary CPL, the secondary CPL and the tertiary CPL are separately disposed in different planes. Moreover, each pump laser, each EDFA, each primary CPL, each secondary CPL and each tertiary CPL are arranged annually to form a closed structure. The input port of each primary CPL is at least connected with a pump laser (for example, as shown in FIG. 15, the input port of each primary CPL may be connected with two pump lasers), and the output port of each tertiary CPL is connected with two EDFAs. Each primary CPL in the primary CPL set is adjacent to the other 2 primary CPLs in the primary CPL set, each secondary CPL in the secondary CPL set is adjacent to the other 2 secondary CPLs in the secondary CPL set, and each tertiary CPL in the tertiary CPL set is adjacent to the other 2 tertiary CPLs in the tertiary CPL set. The output port of the primary CPL is cross-connected with the input port of the secondary CPL via a fiber, and the two secondary CPLs connected with each primary CPL are spaced by the other 2 secondary CPLs. For example, as shown in FIG. 15, the output port of CPL1-1 is connected with CPL2-2 and CPL2-9, while CPL2-2 and CPL2-9 are spaced by CPL2-1 and CPL2-10. The output port of the secondary CPL is similarly cross-connected with the input port of the tertiary CPL via a fiber, and the two tertiary CPLs connected with each secondary CPL are spaced by another tertiary CPL. For example, as shown in FIG. 15, the output port of CPL2-1 is connected with CPL3-2 and CPL3-10, while CPL3-2 and CPL3-10 are spaced by one CPL3-1.

The pump laser is configured to emit pumping laser. The primary CPL is configured to couple the received pumping laser and output two lines of primary pumping laser, and the two lines of primary pumping laser output are respectively output to two different secondary CPLs. The secondary CPL is configured to couple the received primary pumping laser and output two lines of secondary pumping laser to two different tertiary CPLs. The tertiary CPL is configured to couple the received secondary pumping laser and output two lines of tertiary pumping laser to two different EDFAs.

Every 2 pump lasers form a group, and the input port of each primary CPL is connected with a group of pump lasers. Specifically, the input port of CPL1-1 is connected with P01 and P02, the input port of CPL1-2 of CPL1-2 is connected with P03 and P04, the input port of CPL1-3 is connected with P05 and P06, the input port of CPL1-4 is connected with P07 and P08, the input port of CPL1-5 is connected with P09 and P10, the input port of CPL1-6 is connected with P11 and P12, the input port of CPL1-7 is connected with P13 and P14, the input port of CPL1-8 is connected with P15 and P16, the input port of CPL1-9 is connected with P17, and the input port of CPL1-10 is connected with P19 and P20.

The connection mode between the primary CPL and the secondary CPL is specifically as follows: the output port of CPL1-1 is respectively connected to the input port of CPL2-2 and the input port of CPL2-9, the output port of CPL1-2 is respectively connected to the input port of CPL2-3 and the input port of CPL2-10, the output port of CPL1-3 is respectively connected to the input port of CPL2-1 and the input port of CPL2-4, the output port of CPL1-4 is respectively connected to the input port of CPL2-2 and the input port of CPL2-5, the output port of CPL1-5 is respectively connected to the input port of CPL2-3 and the input port of CPL2-6, the output port of CPL1-6 is respectively connected to the input port of CPL2-4 and the input port of CPL2-7, the output port of CPL1-7 is respectively connected to the input port of CPL2-5 and the input port of CPL2-8, the output port of CPL1-8 is respectively connected to the input port of CPL2-6 and the input port of CPL2-9, the output port of CPL1-9 is respectively connected to the input port of CPL2-7 and the input port of CPL2-10, and the output port of CPL1-10 is respectively connected to the input port of CPL2-8 and the input port of CPL2-1.

The connection mode between the secondary CPL and the tertiary CPL is specifically as follows: the output port of CPL2-1 is respectively connected to the input port of CPL3-2 and the input port of CPL3-10, the output port of CPL2-2 is respectively connected to the input port of CPL3-1 and the input port of CPL3-3, the output port of CPL2-3 is respectively connected to the input port of CPL3-2 and the input port of CPL3-4, the output port of CPL2-4 is respectively connected to the input port of CPL3-3 and the input port of CPL3-5, the output port of CPL2-5 is respectively connected to the input port of CPL3-4 and the input port of CPL3-6, the output port of CPL2-6 is respectively connected to the input port of CPL3-5 and the input port of CPL3-7, the output port of CPL2-7 is respectively connected to the input port of CPL3-6 and the input port of CPL3-8, the output port of CPL2-8 is respectively connected to the input port of CPL3-7 and the input port of CPL3-9, the output port of CPL2-9 is respectively connected to the input port of CPL3-8 and the input port of CPL3-10, and the output port of CPL2-10 is respectively connected to the input port of CPL3-9 and the input port of CPL3-1.

The output port of each tertiary CPL is connected with 2 EDFAs. Specifically, the output port of CPL3-1 is connected with A01 and A20, the output port of CPL3-2 is connected with A02 and A03, the output port of CPL3-3 is connected with A04 and A05, the output port of CPL3-4 is connected with A06 and A07, the output port of CPL3-5 is connected with A08 and A09, the output port of CPL3-6 is connected with A10 and A11, the output port of CPL3-7 is connected with A12 and A13, the output port of CPL3-8 is connected with A14 and A15, the output port of CPL3-9 is connected with A16 and A17, and the output port of CPL3-10 is connected with A18 and A19.

In the embodiment of the invention, each EDFA corresponds to one optical fiber, the fiber is connected with the input port and the output port of the EDFA, and 2 different tertiary CPLs are connected with two optical fibers corresponding to the 2 EDFAs to form a fiber pairs. Specifically, the fibers corresponding to A01 and A02 form a fiber pair FP1, the fibers corresponding to A03 and A04 form a fiber pair FP2, the fibers corresponding to A05 and A06 form a fiber pair FP3, the fibers corresponding to A07 and A08 form a fiber pair FP4, the fibers corresponding to A09 and A10 form a fiber pair FP5, the fibers corresponding to A11 and A12 form a fiber pair FP6, the fibers corresponding to A13 and A14 form a fiber pair FP7, the fibers corresponding to A15 and A16 form a fiber pair FP8, the fibers corresponding to A17 and A18 form a fiber pair FP9, and the fibers corresponding to A19 and A20 form a fiber pair FP10.

Further description will be given below in conjunction with the function of each of the above apparatus.

The two lines of pumping laser emitted by each group of pump laser are coupled via the primary CPL, then the primary CPL outputs two lines of primary pumping laser, and each line of primary pumping laser includes 50% of the energy of each of the group of (2) pump lasers. For example, the pumping light of P01 and P02 is input to CPL1-1, and then CPL1-1 respectively outputs 50% of the energy of each of P01 and P02 to CPL2-2 and CPL2-9. That is, CPL1-1 receives 100% of the energy of P01 and 100% of the energy of P02, CPL2-2 receives 50% of the energy of P01 and 50% of the energy of P02, and CPL2-9 also receives 50% of the energy of P01 and 50% of the energy of P02.

The primary pumping laser output by 2 different primary CPLs is coupled by the secondary CPL, the secondary CPL outputs 2 lines of secondary pumping laser, and each line of secondary pumping laser includes 25% of the energy of each of the 4 pump lasers. For example, CPL2-1 receives 2 lines of primary pumping laser output by CPL1-3 and CPL1-10, that is, CPL2-1 receives 50% of the energy of each of P05, P06, P19 and P20, CPL2-1 respectively outputs 2 lines of secondary pumping laser to CPL3-2 and CPL3-10, and each line of secondary pumping laser includes 25% of the energy of each of P05, P06, P19 and P20.

The secondary pumping laser output by 2 different secondary CPLs is coupled by a tertiary CPL, and the tertiary CPL outputs 2 lines of tertiary pumping laser, each line of tertiary pumping laser includes 12.5% of the energy of each of the 8 pump lasers. For example, CPL3-1 receives 2 lines of secondary pumping laser output by CPL2-2 and CPL2-10, CPL2-2 receives 2 lines of primary pumping laser output by CPL1-1 and CPL1-4, and CPL2-10 receives 2 lines of primary pumping laser output by CPL1-2 and CPL1-9, CPL1-1 is connected with P01 and P02, CPL1-4 is connected with P07 and P08, CPL1-2 is connected with P03 and P04, and CPL1-9 is connected with P17 and P18. Thus, CPL3-1 outputs two lines of tertiary pumping laser to A01 and A20, wherein each line of tertiary pumping laser includes 12.5% of the energy of each of the 8 pump lasers of P01, P02, P03, P04, P07, P08, P17 and P18.

It should be noted that, in practical application, the ratio of the two lines of pumping laser output by each level of CPL may also be adjusted according to different requirements, which is not limited here. For example, the pumping light of P01 and P02 is input to CPL1-1, then CPL1-1 outputs 30% of the energy of P01 and 70% of the energy of P02 to CPL2-2, and the CPL1-1 outputs 70% of the energy of P01 and 30% of the energy of P02 to CPL2-9.

It should be noted that, in this solution, the same tertiary CPL may also be connected with two optical fibers corresponding to the 2 EDFAs to form a fiber pairs.

It should be noted that, the input port of each primary CPL may also be connected with other number of pump lasers. For example, the input port of each primary CPL is connected with 1 or 4 pump lasers, which is not limited here.

In an embodiment of the invention, the pumping laser energy of each line of EDFA is jointly provided by 8 pump lasers corresponding thereto, and each pump laser contributes 12.5% of the energy. In this solution, at most 7 pump lasers thereof are allowed to fail, and the EDFA module can still maintain a certain amplification function, thereby improving the system reliability. Moreover, the number of the pump lasers is the same as that of the EDFAs, thus the number of the pump lasers used is small, the cost is low, the overall power consumption is small, and the overall heat consumption is small. Additionally, it may be judged which group of pump lasers operates abnormally by detecting the variation of the output power of EDFA, which may be helpful to the maintenance of the system.

What is claimed is:

1. A submarine network device, comprising a fiber set, a pump laser set, an erbium doped fiber amplifier (EDFA) set, a primary fiber coupler (CPL) set and a secondary CPL set, wherein the primary CPL set comprises N primary CPLs, the secondary CPL set comprises N secondary CPLs, with N being an integer greater than or equal to 3, the fiber set is configured to connect the pump laser set, the primary CPL set, the secondary CPL set and the EDFA set, and an input port of each primary CPL in the primary CPL set is at least connected with a pump laser, an output port of each secondary CPL in the secondary CPL set is at least connected with an EDFA, each primary CPL in the primary CPL set is adjacent to the other two primary CPLs in the primary CPL set, each secondary CPL in the secondary CPL set is adjacent to the other two secondary CPLs in the secondary CPL set, output ports of each primary CPL in the primary CPL set are respectively connected with two different secondary CPLs that are spaced by a secondary CPL, and input ports of each secondary CPL in the secondary CPL set are respectively connected with two different primary CPLs that are spaced by a primary CPL;

each pump laser in the pump laser set is configured to emit pumping laser light, each primary CPL in the primary CPL set is configured to couple pumping laser lights received from the pump lasers and output two lines of primary pumping laser light, the two lines of primary pumping laser light being respectively output to the two different secondary CPLs, and each secondary CPL in the secondary CPL set is configured to couple the received primary pumping laser light and output at least one line of secondary pumping laser light to the at least one EDFA.

2. The submarine network device according to claim 1, wherein each EDFA in the EDFA set corresponds to one optical fiber, and the output port of each secondary CPL in the secondary CPL set is connected with two EDFAs.

3. The submarine network device according to claim 2, wherein the two optical fibers corresponding to the two EDFAs connected with the output port of each secondary CPL form a fiber pair.

4. The submarine network device according to claim 2, wherein one optical fiber corresponding to one of the EDFAs connected with the output port of each secondary CPL and one optical fiber corresponding to one of the EDFAs connected with the output port of a secondary CPL adjacent to said each secondary CPL form a fiber pair.

5. The submarine network device according to claim 1, wherein the input port of each primary CPL in the primary CPL set is connected with two pump lasers, each line of primary pumping laser light output by each primary CPL comprises 50% of the energy respectively emitted by the two pump lasers connected with the input port of each primary CPL, each line of secondary pumping laser light output by each secondary CPL in the secondary CPL set comprises 25% of the energy respectively emitted by the four pump lasers connected with the input ports of two primary CPLs, and each secondary CPL is connected with the two primary CPLs.

6. The submarine network device according to claim 1, wherein the input port of each primary CPL in the primary CPL set is connected with one pump laser, each line of primary pumping laser light output by each primary CPL comprises 50% of the energy respectively emitted by one pump laser connected with the input port of each primary CPL, each line of secondary pumping laser light output by each secondary CPL in the secondary CPL set comprises 25% of the energy respectively emitted by two pump lasers connected with the input ports of two primary CPLs, and each secondary CPL is connected with the two primary CPLs.

7. The submarine network device according to claim 1, wherein the input port of each primary CPL in the primary CPL set is connected with four pump lasers, each line of primary pumping laser light output by each primary CPL comprises 50% of the energy respectively emitted by the four pump lasers connected with the input port of each primary CPL, each line of secondary pumping laser light output by each secondary CPL in the secondary CPL set comprises 25% of the energy respectively emitted by eight pump lasers connected with the input ports of two primary CPLs, and each secondary CPL is connected with the two primary CPLs.

8. The submarine network device according to claim 1, wherein the pump laser set, the EDFA set, the primary CPL set and the secondary CPL set are separately disposed in different planes.

9. The submarine network device according to claim 1, wherein each pump laser in the pump laser set, each EDFA in the EDFA set, each primary CPL in the primary CPL set and each secondary CPL in the secondary CPL set are arranged annually.

10. A submarine network device, comprising a fiber set, a pump laser set, an erbium doped fiber amplifier (EDFA) set, a primary fiber coupler (CPL) set, a secondary CPL set and a tertiary CPL set, wherein the primary CPL set comprises N primary CPLs, the secondary CPL set comprises N secondary CPLs, and the tertiary CPL set comprises N tertiary CPLs, with N being an integer greater than or equal to 5, and the fiber set is configured to connect the pump laser set, the primary CPL set, the secondary CPL set, the tertiary CPL set and the EDFA set, and an input port of each primary CPL in the primary CPL set is at least connected with a pump laser, an output port of each tertiary CPL in the tertiary CPL set is at least connected with an EDFA, wherein each primary CPL in the primary CPL set is adjacent to the other two primary CPLs in the primary CPL set, each secondary CPL in the secondary CPL set is adjacent to the other two secondary CPLs in the secondary CPL set, and each tertiary CPL in the tertiary CPL set is adjacent to the other two tertiary CPLs in the tertiary CPL set, and output ports of each primary CPL in the primary CPL set are respectively connected with two different secondary CPLs, wherein the two different secondary CPLs connected with the output port of each primary CPL are spaced by two secondary CPLs, and input ports of each secondary CPL in the secondary CPL set are respectively connected with two different primary CPLs that are spaced by two primary CPLs, output ports of each secondary CPL in the secondary CPL set are respectively connected with two different tertiary CPLs that are spaced by a tertiary CPLs, and input ports of each tertiary CPL in the tertiary CPL set are connected with two different secondary CPLs, wherein the two different secondary CPLs connected with the input port of each tertiary CPL are spaced by a primary CPL;

each pump laser in the pump laser set is configured to emit pumping laser light, each primary CPL in the primary CPL set is configured to couple the received pumping laser lights received from the pump lasers and output two lines of primary pumping laser light, wherein the two lines of primary pumping laser light are respectively output to the two different secondary CPLs connected with the output port of each primary CPL, and each secondary CPL in the secondary CPL set is configured to couple the received primary pumping laser light and output two lines of secondary pumping laser light to the two different tertiary CPLs, and each tertiary CPL in the tertiary CPL set is configured to couple the received secondary pumping laser light and output at least one line of tertiary pumping laser light to the at least one EDFA.

11. The submarine network device according to claim 10, wherein each EDFA in the EDFA set corresponds to one optical fiber, and the output port of each tertiary CPL in the tertiary CPL set is connected with two EDFAs.

12. The submarine network device according to claim 11, wherein the two optical fibers corresponding to the two EDFAs connected with the output port of each tertiary CPL form a fiber pair.

13. The submarine network device according to claim 11, wherein one optical fiber corresponding to one of the EDFAs connected with the output port of each tertiary CPL and one optical fiber corresponding to one of the EDFAs connected with the output port of a tertiary CPL adjacent to said each tertiary CPL form a fiber pair.

14. The submarine network device according to claim 10, wherein the input port of each primary CPL in the primary CPL set is connected with two pump lasers, each line of primary pumping laser light output by each primary CPL comprises 50% of the energy respectively emitted by two pump lasers connected with the input port of each primary CPL, each line of secondary pumping laser light output by each secondary CPL in the secondary CPL set comprises 25% of the energy respectively emitted by four pump lasers connected with the input ports of two primary CPLs, each secondary CPL is connected with the two primary CPLs, and each line of tertiary pumping laser light output by each tertiary CPL in the tertiary CPL set comprises 12.5% of the energy respectively emitted by eight pump lasers connected with the input ports of four primary CPLs, and each tertiary CPL is connected with two secondary CPLs, and the two secondary CPLs are connected with the four primary CPLs.

15. The submarine network device according to claim 10 the input port of each primary CPL in the primary CPL set is connected with one pump laser, each line of primary pumping laser light output by each primary CPL comprises 50% of the energy respectively emitted by one pump laser connected with the input port of each primary CPL, each line of secondary pumping laser light output by each secondary CPL in the secondary CPL set comprises 25% of the energy respectively emitted by two pump lasers connected with the input ports of two primary CPLs, each secondary CPL is connected with the two primary CPLs, and each line of tertiary pumping laser light output by each tertiary CPL in the tertiary CPL set comprises 12.5% of the energy respectively emitted by four pump lasers connected with the input ports of four primary CPLs, each tertiary CPL is connected with two secondary CPLs, and the two secondary CPLs are connected with the four primary CPLs.

16. The submarine network device according to claim 10 the input port of each primary CPL in the primary CPL set is connected with four pump lasers, each line of primary pumping laser light output by each primary CPL comprises 50% of the energy respectively emitted by four pump lasers connected with the input port of each primary CPL, each line of secondary pumping laser light output by each secondary CPL in the secondary CPL set comprises 25% of the energy respectively emitted by eight pump lasers connected with the input ports of two primary CPLs, and each secondary CPL is connected with the two primary CPLs, and each line of tertiary pumping laser light output by each tertiary CPL in the tertiary CPL set comprises 12.5% of the energy respectively emitted by sixteen pump lasers connected with the input ports of four primary CPLs, each tertiary CPL is connected with two secondary CPLs, and the two secondary CPLs are connected with the four primary CPLs.

17. The submarine network device according to claim 10, wherein the pump laser set, the EDFA set, the primary CPL set, the secondary CPL set and the tertiary CPL set are separately disposed in different planes.

18. The submarine network device according to claim 10, wherein each pump laser in the pump laser set, each EDFA in the EDFA set, each primary CPL in the primary CPL set, each secondary CPL in the secondary CPL set and each tertiary CPL in the tertiary CPL set are arranged annually.

19. A submarine network device, comprising: a pump laser set, an erbium doped fiber amplifier (EDFA) set, a primary fiber coupler (CPL) set and a secondary CPL set, wherein the primary CPL set at least comprises three CPL primary CPLs, the secondary CPL set at least comprises three secondary CPLs, and an input port of each primary CPL in the primary CPL set is at least connected with a pump laser, an output port of each secondary CPL in the secondary CPL set is connected with at least one EDFA in the EDFA set, output ports of at least one primary CPL in the primary CPL set are respectively connected with two different secondary CPLs that are spaced by a secondary CPL, and input ports of at least one secondary CPL in the secondary CPL set are respectively connected with two different primary CPLs that are spaced by a primary CPL;

each pump laser in the pump laser set is configured to emit pumping laser light, at least one primary CPL in the primary CPL set is configured to couple pumping laser lights received from the pump lasers and output two lines of primary pumping laser light, the two lines of primary pumping laser light being respectively output to the two different secondary CPLs, and at least one secondary CPL in the secondary CPL set is configured to couple the received primary pumping laser light and output at least one line of secondary pumping laser light to the at least one EDFA.

20. The submarine network device according to claim 19, wherein each EDFA in the EDFA set corresponds to one optical fiber, and the output port of each secondary CPL in the secondary CPL set is connected with two EDFAs.

21. The submarine network device according to claim 20, wherein the two optical fibers corresponding to two EDFAs connected with the output port of each secondary CPL form a fiber pair.

22. The submarine network device according to claim 20, wherein one optical fiber corresponding to one of the EDFAs connected with the output port of each secondary CPL and one optical fiber corresponding to one of the EDFAs connected with the output port of a secondary CPL adjacent to said each secondary CPL form a fiber pair.

* * * * *